US012775683B2

(12) United States Patent
Heffner et al.

(10) Patent No.: US 12,775,683 B2
(45) Date of Patent: Oct. 27, 2026

(54) DATA PROTECTION THROUGH RANDOMIZED SPATIAL IMAGING

(71) Applicant: Honeywell International Inc., Charlotte, NC (US)

(72) Inventors: Kenneth H. Heffner, Largo, FL (US); James L. Tucker, Clearwater, FL (US)

(73) Assignee: Honeywell Aerospace US LLC, Phoenix, AZ (US)

( * ) Notice: Subject to any disclaimer, the term of this patent is extended or adjusted under 35 U.S.C. 154(b) by 64 days.

(21) Appl. No.: 19/046,755

(22) Filed: Feb. 6, 2025

(65) Prior Publication Data

US 2025/0258896 A1 Aug. 14, 2025

Related U.S. Application Data

(60) Provisional application No. 63/728,815, filed on Dec. 6, 2024, provisional application No. 63/553,533, filed on Feb. 14, 2024.

(51) Int. Cl.
*G06F 21/16* (2013.01)
*G06T 15/00* (2011.01)
*H04L 9/32* (2006.01)

(52) U.S. Cl.
CPC .............. *G06F 21/16* (2013.01); *G06T 15/00* (2013.01); *H04L 9/3278* (2013.01)

(58) Field of Classification Search
CPC ........ G06F 21/16; G06T 15/00; H04L 9/3278
USPC .......................................................... 713/176
See application file for complete search history.

(56) References Cited

U.S. PATENT DOCUMENTS 7,429,915 B2 9/2008 Cruzado et al.
8,981,810 B1 * 3/2015 Trimberger .......... H03K 19/003 326/8
8,995,658 B2 3/2015 Heffner
9,465,960 B2 10/2016 Tucker et al.
(Continued)

FOREIGN PATENT DOCUMENTS

CN 111953313 B 11/2020
SK 392011 A3 6/2013
WO 2022159031 A1 7/2022

OTHER PUBLICATIONS

Aysu et al., "Digital Fingerprints for Low-Cost Platforms using MEMS sensors", WESS '13: Proceedings of the Workshop on Embedded Systems Security, Sep. 2013, Article No. 2, pp. 1 through 6.

(Continued)

*Primary Examiner* — Badri Narayanan Champakesan
(74) *Attorney, Agent, or Firm* — Fogg & Powers LLC

(57) ABSTRACT

A method for determining whether data on a device has changed from an original version of the data ("the original data") is provided. The method comprising: converting the data to a first three-dimensional (3D) spatial representation of the data, wherein the first 3D spatial representation represents multiple characteristics of the data using a position of a point and/or vacancy in the first 3D spatial representation; wherein converting the data to the first 3D spatial representation comprises converting the data using a same process used to generate a second 3D spatial representation from the original data; analyzing the first 3D spatial representation using one or more spatial processes; and determining whether the data has changed based on the analysis of the first 3D spatial representation.

18 Claims, 14 Drawing Sheets

(56) References Cited

U.S. PATENT DOCUMENTS

| | | | |
|---|---|---|---|
| 9,806,718 | B2 | 10/2017 | Wallrabenstein |
| 10,015,148 | B2 | 7/2018 | Heffner |
| 10,754,619 | B2 | 8/2020 | Satpathy et al. |
| 10,819,528 | B2 * | 10/2020 | Sharifi .................. H04L 9/3278 |
| 11,336,468 | B2 | 5/2022 | Nguyen et al. |
| 2005/0144456 | A1 * | 6/2005 | Acharya ............ H04N 1/32187 713/176 |
| 2006/0242465 | A1 | 10/2006 | Cruzado et al. |
| 2008/0129501 | A1 | 6/2008 | Tucker et al. |
| 2008/0132118 | A1 | 6/2008 | Dalzell et al. |
| 2013/0051657 | A1 * | 2/2013 | Ostermann .......... G06V 10/758 382/154 |
| 2015/0200775 | A1 | 7/2015 | Guajardo Merchan et al. |
| 2017/0070499 | A1 * | 3/2017 | Sweet ..................... G06F 21/55 |
| 2018/0294981 | A1 | 10/2018 | Willers |
| 2020/0162500 | A1 | 5/2020 | Ciocarlie et al. |
| 2022/0398348 | A1 * | 12/2022 | Voloshynovskiy .......................... G06F 18/2135 |
| 2023/0143362 | A1 | 5/2023 | Datskos et al. |
| 2023/0153085 | A1 * | 5/2023 | Shi ............................ G06F 8/41 717/136 |
| 2023/0266945 | A1 | 8/2023 | Defoort et al. |
| 2024/0127614 | A1 * | 4/2024 | Kim .......................... G06T 5/70 |
| 2024/0144623 | A1 * | 5/2024 | Gori .......................... G06T 7/70 |

OTHER PUBLICATIONS

Baddeley, "Spatial Point Processes and their Applications" in Stochastic Geometry Lecture Notes in Mathematics, Berlin: Springer-Verlag, pp. 1 through 75, 2007.

Bakiri et al., "Survey on hardware implementation of random number generators on FPGA: Theory and experimental analyses", Computer Science Review, Feb. 2018, vol. 27, pp. 135-153, hal-02182827.

Bedekar et al., "A Novel Approach to True Random Number Generation in Wearable Computing Environments Using MEMS Sensors", Springer International Publishing, Switzerland, Jan. 2015, Inscrypt 2014, LNCS 8957, pp. 530 through 546.

Bossuet et al., "A PUF Based on a Transient Effect Ring Oscillator and Insensitive to Locking Phenomenon", IEEE Transactions on Emerging Topics in Computing. vol. 2, Issue No. 1, Oct. 2013, Current version, May 7, 2014, pp. 30 through 36.

Cao et al., "Entropy Sources Based on Silicon Chips: True Random Number Generator and Physical Unclonable Function", Entropy 2022, vol. 24, Issue 11, Oct. 30, 2022, pp. 1 through 39.

European Patent Office, "Extended European Search Report", dated Jan. 3, 2025, from U.S. Appl. No. 18/661,373, from Foreign Counterpart to U.S. Appl. No. 18/661,373, pp. 1 through 9, Published: EP.

Gangurde, Saurabh, "Accelerometer as Random Number Generator", Electrical Engineering Department, IIT Bombay, Feb. 2017, as downloaded Nov. 17, 2023 from http://www.ee.iitb.ac.in/~stallur/wp-content/uploads/2017/02/Saurabh.pdf. pp. 1 through 4.

Garcia-Bosque et al., "Application of a MEMS-Based TRNG in a Chaotic Stream Cipher", Sensors 2017, vol. 17, No. 646, Mar. 2017, pp. 1 through 13.

Garcia-Bosque, "Design of New Chaotic Ciphers for Ethernet Traffic", Doctoral Thesis, Universidad de Zaragoza, Zaragoza, Spain, Sep. 2019, No. 36, Page(s) Cover through 161 (Parts 1 of 2 and 2 of 2).

Labrado et al., "Design of a Piezoelectric Based Physically Unclonable Function for loT Security", Published in IEEE Internet of Things Journal, vol. 6, Issue: 2, Oct. 2018, pp. 2770 through 2777.

Maiti et al., "Physical Unclonable Function and True Random Number Generator: a Compact and Scalable Implementation", GLSVLSI '09: Proceedings of the 19th ACM Great Lakes symposium on VLSI, May 2009, pp. 425 through 428.

Medhi et al., "PUF-Based Key Generation Scheme for Secure Group Communication Using MEMS", Electronics 2021, vol. 10, No. 1691, Jul. 15, 2021, pp. 1 through 18.

Nannipieri et al., "True Random Number Generator Based on Fibonacci-Galois Ring Oscillators for FPGA", Applied Sciences, vol. 11, No. 3330, Apr. 7, 2021, pp. 1 through 19.

Pratihar et al., "A Tale of Twin Primitives: Single-chip Solution for PUFs and TRNGs", Cryptology ePrint Archive, Paper 2021/1067, Aug. 2021, pp. 1 through 9.

Radeskog, "Tamper Sensing using Low-Cost Accelerometers", KTH Master Thesis, Stockholm, Sweden, Mar. 2012, XR-EE-SB 2012:003, Page(s) Cover through 65.

Randa et al., "Delay-Based True Random Number Generator in Sub-Nanomillimeter IoT Devices", Electronics 2020, vol. 9, No. 817, May 15, 2020, pp. 1 through 15.

Sadr et al., "Physical Unclonable Function (PUF) Based Random Number Generator", Advanced Computing: An International Journal (ACIJ), vol. 3, No. 2, Mar. 2012, pp. 139 through 145.

Sala et al., "Exploiting the DD-Cell as an Ultra-Compact Entropy Source for an FPGA-Based Re-Configurable PUF-TRNG Architecture", IEEEAccess, vol. 11, Aug. 14, 2023, pp. 86178 through 86195.

Scheel et al., "Characterizing Active User-Device Physical Unclonable Functions (PUFs) based on Mobile Device Touchscreen", TrustED '15: Proceedings of the 5th International Workshop on Trustworthy Embedded Devices, Oct. 2015, pp. 1 through 12.

Willers et al., "MEMS Gyroscope at Physical Unclonable Functions", Proceedings of the 2017 ACM on Conference on Information and Knowledge Management, CIKM '17, Oct. 24, 2016, pp. 591 through 602.

Willers et al., "MEMS-based Gyroscopes as Physical Unclonable Functions", Cryptology ePrint Archive, Paper 2016/261, Mar. 2016, pp. 1 through 14.

Willers, "MEMS Sensors as Physical Unclonable Functions", Doctoral Dissertation, Universität des Saarlandes, Oct. 25, 2019, Page(s) Cover through 137.

Das, Shamik, "Microelectronics Quantfiable Assurance (MQA) Independent Assessment", Mar. 1, 2023, pp. 1 through 81.

European Patent Office, "Extended European Search Report", dated Oct. 13, 2025, from EP Application No. 25157129.5, from Foreign Counterpart to U.S. Appl. No. 19/046,755, pp. 1 through 11, Published: EP.

European Patent Office, "Partial European Search Report", dated Jul. 22, 2025, from U.S. Appl. No. 19/046,755, from Foreign Counterpart to U.S. Appl. No. 19/046,755, pp. 1 through 14, Published: EP.

European Patent Office, "Extended European Search Report", dated Jun. 27, 2025, from U.S. Appl. No. 19/046,755 from Foreign Counterpart to U.S. Appl. No. 19/046,755. pp. 1 through 10, Published: EP.

European Patent Office, "Communication pursuant to Article 94(3)EPC", dated Jun. 23, 2026, from EP Application No. 25157038.8, from Foreign Counterpart to U.S. Appl. No. 19/046,755, pp. 1 through 6, Published: EP.

European Patent Office, "Communication pursuant to Article 94(3)EPC", dated Jul. 7, 2026, from EP Application No. 25157129.5, from Foreign Counterpart to U.S. Appl. No. 19/046,755, pp. 1 through 8, Published: EP.

* cited by examiner

```
<!Doctype html>
<html>
 <head>
  <title>Hello World</title>
  <script type="text/javascript">
   // I-check kung available yung service worker sa browser
   if('serviceworker' in navigator){
    // I-register na yung service worker file mo
    navigator.serviceWorker.register('/serviceworker.js').then(reg=>{
     // Kapag naging successful i-log sa console na naging successful yung pag
register
     console.log('Service Worker Registered Successfully!');
    }).catch(err=>{
     // Kapag hindi naman ay mag log sa console ng error
     console.error(`Service Worker Registration Error: ${err}`);
    });
   }
  </script>
 </head>
 <body>
  <h1>Hello World</h1>
 </body>
</html>
```

FIG. 2A

```
<!Doctype html>
<html>
<head>
  <title>Hello World</title>
  <script type="text/javascript">
   // I-check kung available yung service worker sa browser
   If('serviceworker' in navigator){
   // I-register na yung service worker file mo
   navigator.serviceWorker.register('/serviceworker.js').then(reg=>{
   // Kapag naging successful i-log sa console na naging successful yung pag
register
      console.log('Service Worker Registered Successfully!');
     }).catch(err=>{
       // Kapag hindi naman ay mag log sa console ng error
       console.error('Service Worker Registration Error: ${err}');
    });
   }
  </script>
 </head>
 <body>
   <h1>Hello World</h1>
 </body>
</html>
```

Yellow
Green
Blue

FIG. 2B

```
<!Δοχτψπε ητμλ><ητμλ><ηεαδ><τιτλε>Ηαλλο μενσεν</τιτλε> <ηεαδ>
=∀τεξτ/φαωασχριπτ <σχριπτ τψπε=∀τεξτ/φαωασχριπτ∀> <ηεαδ> [illegible]
οφ δε σερωιχεμεδεωερκερ βεσχηικβααρ ισ ιν δε βροωσερ. ιφ(∋σερωιχεωορκερ∋
ιν ναωιγατορ){Ρεγιστρεερ υω σερωιχε ωορκερ~
βεσταν∂.ναωιγατορ.σερωιχεΩορκερ.ρεγιστερ.φσ∋).τηεν
(∋/σερωιχεωορκερ.φσ∋).τηεν(ρεγ=>{Ωαννεερ διτ ισ γελυκτ, μελδτ υ ζιχη ααν βιφ
δε χονσολε διε σ[illegible]χεσωολ ισ. χονσολε.λογ(∋Σερωιχε Ωορκερ
Γερεγιστρεερδ!∋);}).χατχη(ερρ=>{Αλσ διτ νιετ ηετ γεωαλ ισ, ωορδτ δε
χονσολεφουτ (∃{ερρ}∋).∃{ερρ}∋);χονσολε.ερρορ  πιεφουτ
σερωιχεμεδεωερκερ: ∋Ρεγιστρα});}</σχριπτ>  </ηεαδ> ητμλ> </ητμλ>
  <βοδψ> <η1>Ηαλλο μενσεν</η1> </βοδψ>
```

Yellow
Green
Blue

FIG. 2C

DATA PROTECTION THROUGH RANDOMIZED SPATIAL IMAGING

CROSS REFERENCE TO RELATED APPLICATIONS

This application claims the benefit of prior filed U.S. Provisional Patent Application Ser. No. 63/553,533 filed on Feb. 14, 2024 (the '533 Application) and U.S. Provisional Patent Application Ser. No. 63/728,815 filed on Dec. 6, 2024 (the '815 Application). The '533 Application and the '815 Application are incorporated herein by reference.

BACKGROUND

Global markets are moving to digital transformation wherein high-performance computing, communications and software technologies are essential enablers for forthcoming autonomous, intelligent command and control used in new commerce and infrastructure. Data Integrity and Software Integrity are under continuous exposure to attack from hackers and insiders. The corruption of software and data leads to high vulnerability of devices and systems containing and/or using data and software with catastrophic results. Theft of intellectual property and reverse engineering by insiders and espionage results in loss of Return on Investment and competitiveness in billions of dollars each year. To perform digital transformation, global markets and governments will need to apply digital engineering that relies heavily on data and software integrity.

As referred to herein, digital field of view (DFoV) refers to a process for employing continuous digital engineering data/software integrity verification across an entire scope of data and software applications. Maintaining integrity in the DFoV is challenging for the following reasons:

1. A central authority may be infeasible.
2. The digital environment is dynamically and constantly changing.
3. The environment must maintain interoperability and backwards compatibility.
4. The DFoV may include proprietary commercial software or service elements.
5. It is costly to verify elements, including open source, are trustworthy.

Companies are reluctant to subject their offerings in hardware and software to independent verification testing as it exposes their critical IP to the risk of theft, malware insertion or reverse engineering. These and other challenges slow the progress in the advancement of digital transformation.

As data sets get larger, new methods are needed to securely manage digital configurations. Digital configurations must allow for validation of the DFOV while accounting for the necessary and constant change within the DFoV. The DFOV will change due to updates to versions of software, inclusion or removal of elements, patches etc. Though traditional methods of cryptographic authentication are the foundation of data validation at the application module level, as the DFoV becomes larger and more modules are incorporated, then the use of hash functions becomes unreliable due to the likelihood that some change will occur ahead of the means to validate them due to the propagation delay of the corresponding hash digest values. Further, the threat of data or software code corruption by an insider loses trackability in spite of encryption practices. Failure to resolve an item would result in denial-of-service and failures to the system as a whole. A solution is needed to enable digital transformation to advance.

SUMMARY

A method for determining whether data on a device has changed from an original version of the data ("the original data") is provided. The method comprising: converting the data to a first three-dimensional (3D) spatial representation of the data, wherein the first 3D spatial representation represents multiple characteristics of the data using a position of a point and/or vacancy in the first 3D spatial representation; wherein converting the data to the first 3D spatial representation comprises converting the data using a same process used to generate a second 3D spatial representation from the original data; analyzing the first 3D spatial representation using one or more spatial processes; and determining whether the data has changed based on the analysis of the first 3D spatial representation.

BRIEF DESCRIPTION OF THE DRAWINGS

Understanding that the drawings depict only some embodiments and are not therefore to be considered limiting in scope, the exemplary embodiments will be described with additional specificity and detail using the accompanying drawings, in which:

FIG. 2A is an illustration of example data to be protected;

FIG. 2B is an illustration of example watermarking of the data shown in FIG. 2A;

FIG. 2C is an illustration of example watermarked, mutated data generated from the data shown in FIG. 2A;

Figure 1:
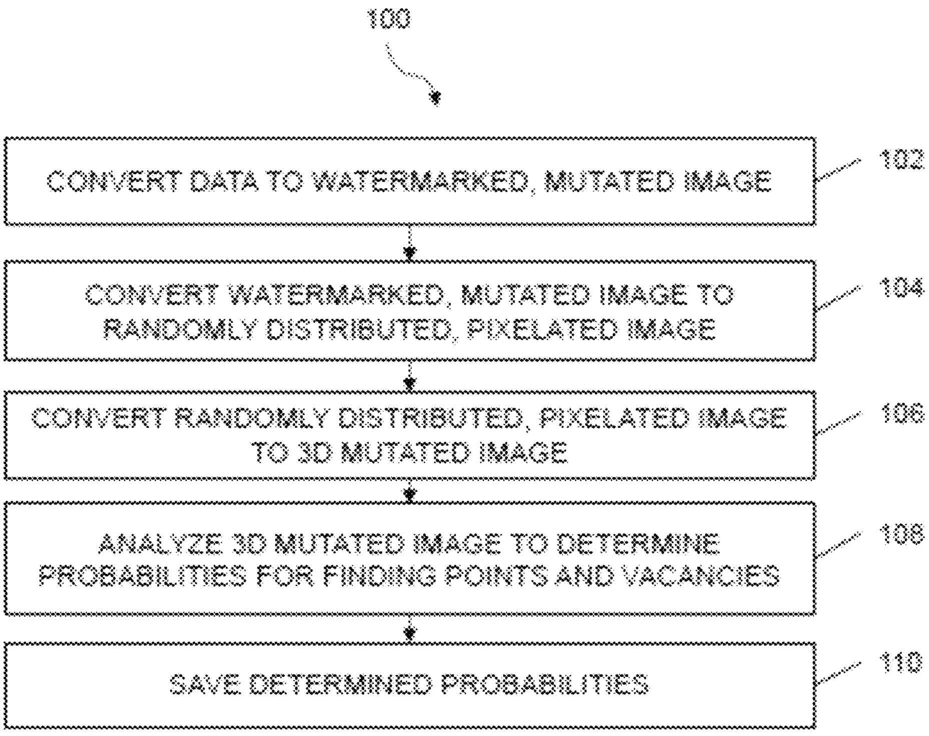
FIG. 1 is a flow diagram of an example method of protecting data.

In accordance with common practice, the various described features are not drawn to scale but are drawn to emphasize specific features relevant to the example embodiments.

DETAILED DESCRIPTION

In the following detailed description, reference is made to the accompanying drawings that form a part hereof, and in which are shown by way of illustration specific illustrative embodiments. However, it is to be understood that other embodiments may be utilized, and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Data Protection Through Randomized Spatial Imaging

Global markets are moving to digital transformation wherein high-performance computing, communications, and software technologies are essential enablers for forthcoming autonomous, intelligent command and control used in new commerce and infrastructure. Data integrity and software integrity are under continuous exposure to attack from hackers and insiders. The corruption of software and data leads to high vulnerability of devices and systems containing and/or using data and software with catastrophic results. Theft of intellectual property and reverse engineering by insiders and espionage results in loss of Return on Investment and competitiveness in billions of dollars each year. To perform digital transformation, global markets and governments will need to apply digital engineering that relies heavily on data and software integrity.

Traditionally, data undergoes a number of processes before it is saved in a data file. For example, symmetric and/or asymmetric hashing tools are used to encrypt data files prior to saving or transmission. However, if a nefarious actor is able to gain access to the data file (for example, if employed at a company that produced the data file), then the person can decrypt the data file and obtain the original data. If this occurs, the person may be able to alter the data, rehash the data, and encrypt the data with a time stamp that hides the modification. In these situations, this corrupted data file will appear to be a normal data file with legitimate encryption when it is used and distributed. Current techniques for data integrity cannot detect this type of corrupted data file.

Companies are reluctant to subject their offerings in hardware and software to independent verification testing as it exposes their critical Intellectual Property (IP) to the risk of theft, malware insertion or reverse engineering. These and other challenges slow the progress in the advancement of digital transformation.

The example techniques for protecting data described herein ensure data integrity through conversion of the data to a three-dimensional (3D) mutated image and analysis of the 3D mutated image. The 3D mutated image includes randomly distributed pixels and vacancies that can be analyzed for and used for data verification to ensure that the data received has not been changed from the original version. Some of the randomly distributed pixels can include watermarks that are used for identifying strategically important or exploitable data that is likely to be targeted by a nefarious actor.

FIG. 1 illustrates a flow diagram of an example method 100 for protecting data. In the examples described with respect to FIG. 1, the data can include any data that can be a target for insider threat. For example, the data can include, but is not limited to, software code, tools, images, drawings, digitized data, and/or text. Typically, software code is created with a text editor or visual programming tool.

The method 100 includes converting data to a watermarked, mutated image (block 102). The conversion includes adding strategically placed watermarks of one or more types to the original data to be protected, mutating the watermarked data and converting the watermarked, mutated data to an image (watermarked, mutated image). In other examples, the conversion includes converting the watermarked data to an image and mutating the watermarked image to generate a watermarked, mutated image. In some examples, mutating data or mutating an image includes applying a mutation function to the data or image. In some examples, PUF values and/or TRNs are used to confound the traditional mutative condition of the data, which provides further protection against potential brute force reassembly of the mutated images by a bad actor.

Figure 2:
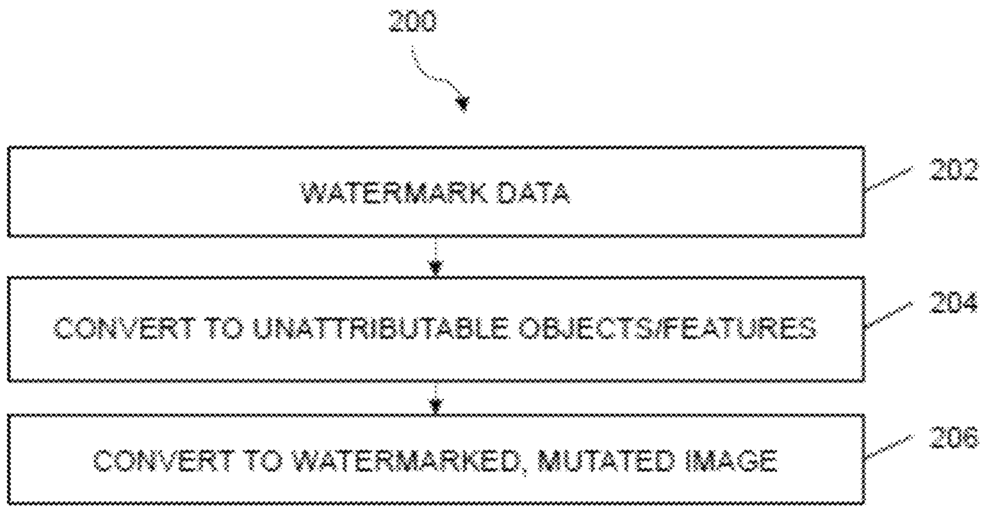
FIG. 2 is a flow diagram of converting data to a watermarked, mutated image.

FIG. 2 is a flow diagram of an example method 200 of converting data into a watermarked, mutated image. The blocks of the flow diagram in FIG. 2 have been arranged in a generally sequential manner for ease of explanation; however, it is to be understood that this arrangement is merely exemplary, and it should be recognized that the processing associated with method 200 (and the blocks shown in FIG. 2) can occur in a different order or where at least some of the processing associated with the blocks is performed in parallel in an event-driven manner. For example, the watermarked data can be converted to an image (block 206) prior to applying the mutation function (block 204).

The method 200 includes watermarking the data (block 202). The data is watermarked using one or more different types of watermarks (for example, different color watermarks). In some examples, a different type of watermark is used to mark different features of the data. For example, if the data is software code, a first type of watermark could be used to identify a line of code that is easily exploitable, a second type of watermark could be used to identify a line of code that is easily obfuscated, and a third type of watermark could be used to identify a line of code that, if modified, would cause the most damage. Other selection criteria for the watermarking could also be used. In general, the watermarks of one or more different types are strategically placed to enhance traceability of key features of the data to be tracked for data verification. An example of original code and that code after watermarking are shown in FIGS. 2A-2B. The different watermarks are shown as different colors (as identified by the color key) in the example shown in FIG. 2B.

In some examples, the watermarking of the data is performed automatically using an algorithm. In other examples, the watermarking of the data is performed manually, which can be less predictable and more random. This would typically be performed by a known individual that is one, or only, of an exclusive community of individuals with access to the data. In some examples, the watermarking is performed in close proximity to when converting the data to an image. Additional safeguards regarding the individual or algorithms used to watermark the data can also be used.

The method 200 includes applying a mutation function (block 204). In some examples, applying a mutation function includes converting the watermarked data to unattributable objects/features. In some examples, applying a mutation function includes using pseudorandom numbers or using a PUF and/or TRNG. In some examples, a mutation function is applied to the watermarked data to produce the objects/features. Other techniques could also be used as long as those processes produce objects/features that are unattributable to the original data. However, the watermarks are retained in the unattributable objects/features. An example of mutated, watermarked code is shown in FIG. 2C (with the colors of the watermarks identified in the included key).

The method 200 further includes converting to an image (block 206). The particular mechanism for conversion to an image depends on the particular form of data that is being converted. For example, if the data to be protected is Python code, some example steps for converting the Python code to an image can include: installing Aspose. Words for Python via .NET, adding a library reference to the Python project, opening the source text file in Python, calling the "save( )" method and passing an output filename with image extension, and getting the result of the text conversion as an image. Techniques for converting other types of data to an image known in the art can be used for those respective types of data. In some examples, the resolution of the image can be selected depending on the amount of content to be examined, cost, and time considerations.

Referring back to FIG. 1, the method 100 further includes converting the watermarked, mutated image into a randomly distributed, pixelated image (block 104). The randomly distributed, pixelated image is in two dimensions and includes points (or particles) and vacancies. In some examples, the watermarks will be represented with different colors in the 2D randomly distributed, pixelated image. For purposes of this specification, the colors in the 2D randomly distributed, pixelated image are represented by grayscale with appropriate keys included in the drawings.

Figure 5A:
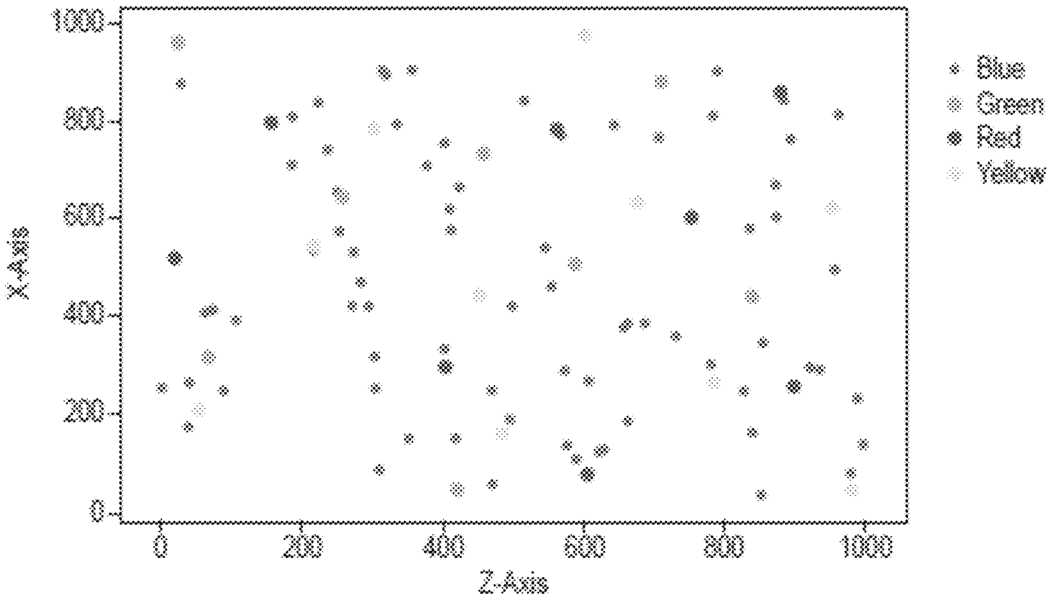
FIG. 5A is an illustration of an example randomly distributed, pixelated image derived from the data shown in FIG. 2A.

An example 2D randomly distributed, pixelated image is shown in FIG. 5A that is generated from the data shown in the various stages shown in FIGS. 2A-2C. The use of grayscale to represent color along with a key is carried forward into FIG. 5A-5D. For the purposes of this description, the points of the 2D randomly distributed, pixelated image are randomly distributed in the X-Z plane. In some examples, the watermarked, mutated image is converted into a randomly distributed, pixelated image using a pseudorandom-based algorithm. In some examples, the pseudorandom-based algorithm converts bits to point coordinates in the X-Z plane such that the bits of data represented by the watermarked, mutated image are represented by points in the 2D randomly distributed, pixelated image. Examples algorithms for this conversion can be found in MINITAB or similar programs. In some examples, a PUF function and/or TRN function of a MEMS device is used in combination with the algorithm to generate the random distribution and pixelation. It should be understood that any technique for converting an image to randomly distributed, pixelated image can be used to convert the watermarked, mutated image into a randomly distributed, pixelated image.

Figure 5B:
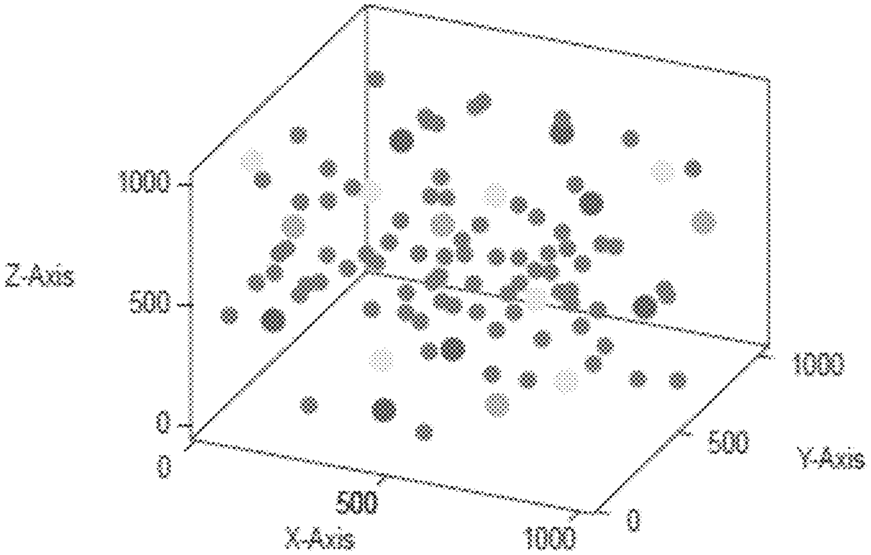
FIG. 5B is an illustration of an example 3D mutated image derived from data.

The method 100 further includes converting the randomly distributed, pixelated image into a three-dimensional (3D) mutated image (block 106). In some examples, the points of the 2D randomly distributed, pixelated image are randomly moved to a height/altitude on the Y-axis such that the points are distributed in a 3D image. In some examples, a pseudorandom-based number algorithm is used to assign the height/amplitude to the points of the 2D randomly distributed, pixelated image. In other examples, a TRNG function is used to assign the height/amplitude to the points of the 2D randomly distributed, pixelated image. In some such examples, the TRNG utilizes at least one MEMS sensor to provide the random numbers that are used as the height/amplitude of the points. An example 3D mutated image generated from the 2D randomly distributed, pixelated image of FIG. 5A is shown at FIG. 5B.

Figure 5C:
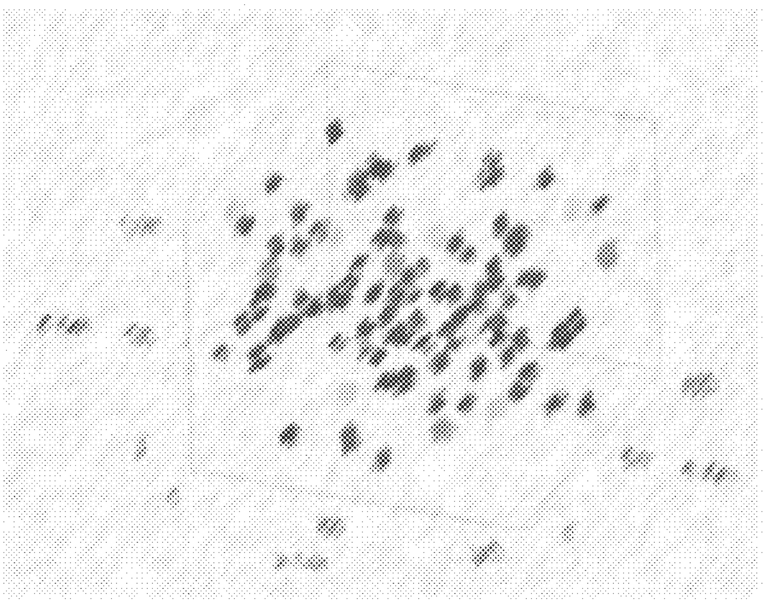
FIGS. 5C-5D are illustrations of example probability distributions derived from data.
Figure 5D:
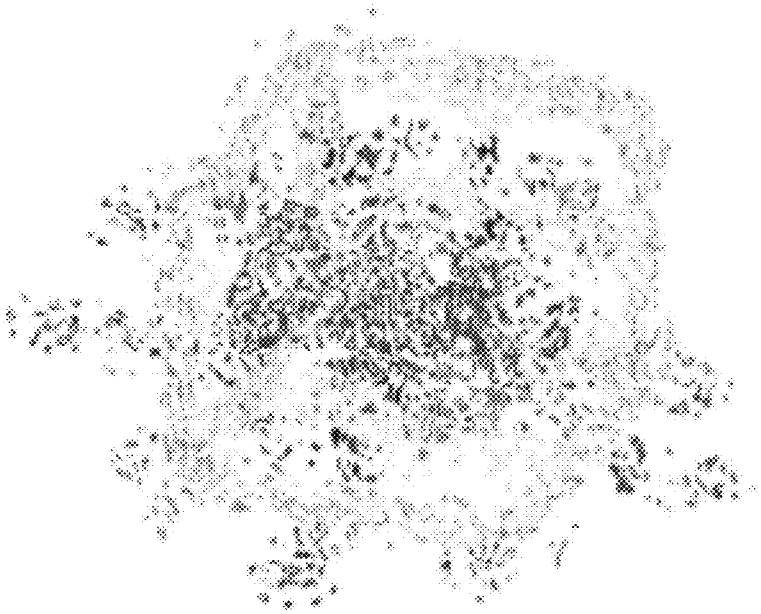

The method 100 further includes analyzing the 3D mutated image to determine probabilities for finding points and vacancies in the 3D mutated image (block 108). In some examples, the analysis includes a determination of probabilities for finding various grades of pixels in the three-dimensional image. Some example probability distributions generated from the 3D mutated image of FIG. 5B are shown at FIGS. 5C-5D.

In some examples, the 3D mutated image is analyzed using a spatial point process (for example, a Poisson Spatial Process). In such examples, the process includes selecting boundaries for analysis, selecting occupied and vacancy modes, selecting a homogeneity mode, and selecting a spatial model. In some examples, the spatial model can include running a time-based series that is uniform over a spherical surface. In other words, a point is created at the centroid. Example spatial point processes are discussed in detail, for example, in A. Baddeley, "Spatial point processes and their applications" in Stochastic Geometry Lecture Notes in Mathematics, Berlin: Springer-Verlag, pp. 1-75, 2007, which is incorporated herein by reference.

In some examples, a density function used in the spatial point process (for example, a Poisson Spatial Process) is determined based on an output of a PUF module. For example, the output of a PUF module is used to modify the density function in a Poisson Spatial Process. Since each PUF module is unique, using the output of a PUF module will result in a different series of probabilities for finding the points and vacancies to be generated.

In other examples, alternative techniques can be used to analyze the 3D mutated image to determine probabilities for finding the points and vacancies in the 3D mutated image. For example, a high-frequency reflection function could be implemented that reflects off of defined boundary walls in a random pattern. Other techniques that identify points and vacancies within a boundary can also be used.

In some examples, the techniques used to analyze the 3D mutated image apply a temporal order of the point and vacancy detections as part of the analysis. This results in point and vacancy detection in a particular order around the space under analysis, which can be used for verification as discussed herein.

In some examples, the boundaries of the analysis of the 3D mutated image are limited to less than the total boundaries of the 3D mutated image, which can be beneficial in reducing the time it takes to conduct the analysis and later for verification. The boundaries can be strategically defined to include at least some watermarked points so it can be verified whether the important parts of data have not been altered.

While the above description with respect to block 108 describes using a single spatial point process or alternative technique for determining the probabilities for finding the points and vacancies, it should be understood that multiple spatial point processes or alternative techniques can be used with different boundaries as part of the analysis. In some examples, the different processes or techniques can be executed in parallel such that the overall time required to obtain probabilities for multiple distinct boundaries can be reduced.

The method 100 further includes saving the determined probabilities (block 110). In some examples, the probabilities for finding points and vacancies are stored. In some examples, probabilities for different grades of pixels (for example, points, points with watermarks, vacancies) are stored for future use for data verification and can be distributed to various devices in a trusted network.

Figure 3:
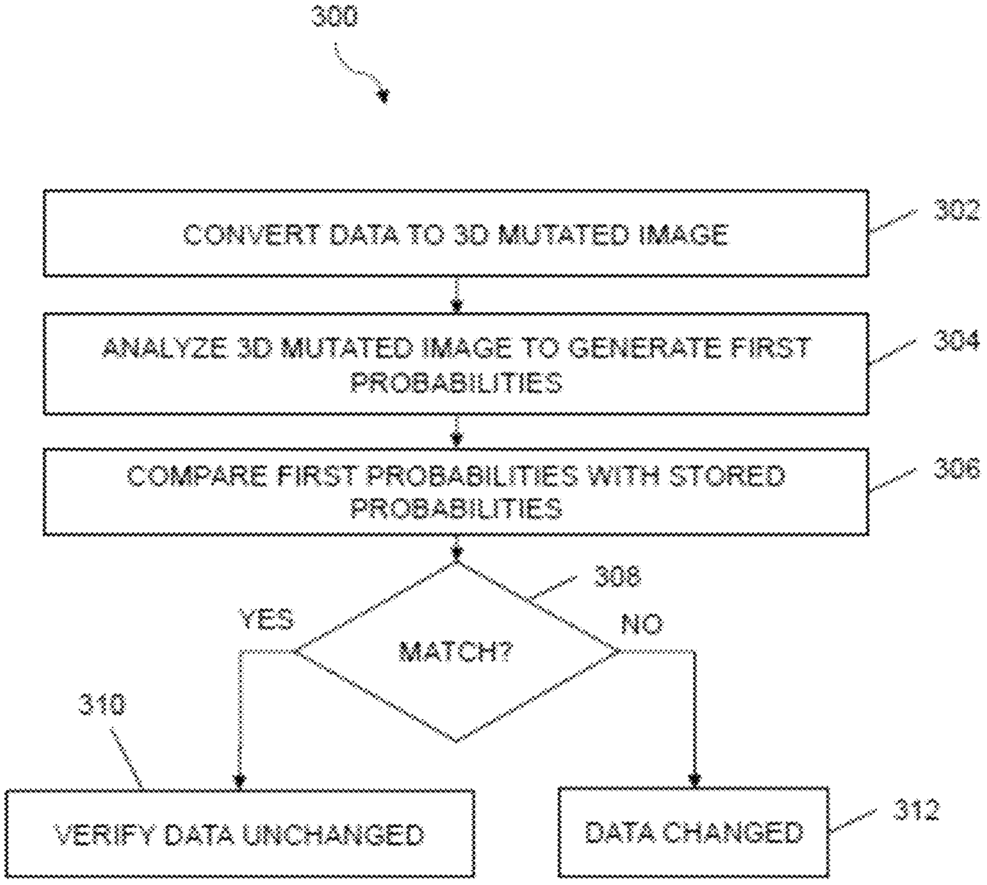
FIG. 3 is a flow diagram of an example method of data verification.

FIG. 3 is a flow diagram of an example method 300 of verifying whether data stored on a device has been changed. The method 300 can be performed by a device whenever the data is called up for use or as a condition for using the data to ensure that the data image, and therefore the data itself, has not changed.

The method 300 includes converting data to a 3D mutated image (block 302). The techniques for converting data to a 3D mutated image are discussed above with respect to block 102, block 104, and block 106. In some examples, the device generates the 3D mutated image using same processes, random numbers, etc. that were used to create a 3D mutated image from the original data. In examples where the device generated the original data, information regarding the processes, random numbers, etc. used to generate the 3D mutated image from the original data can be stored in a memory of the device after generation by the device. In other examples where a different device generated the original data, information regarding the processes, random numbers, etc. used to generate the 3D mutated image from the original data can be provided to the device by another entity (for example, a master device) after a verification process is performed and then the device can store the information in a memory of the device.

The method 300 further includes analyzing the 3D mutated image to generate first probabilities (block 304). In some examples, analyzing the 3D mutated image according to block 304 is similar to the analyzing discussed above with respect to block 108. In examples where the device has analyzed the 3D mutated image generated from the original data, information regarding the processes, density function, etc. used to analyze the 3D mutated image from the original data can be stored in a memory of the device after analysis by the device. In other examples where a different device has analyzed the 3D mutated image generated from the original data, information regarding the processes, density function, probabilities, etc. used to analyze the 3D mutated image from the original data can be provided to the device by another entity (for example, a master device) after a verification process is performed and then the device can store the information in a memory of the device. Further, the probabilities generated from the analysis are stored in the device and are referred to herein as "stored probabilities."

The method 300 further includes comparing the first probabilities with stored probabilities (block 306) and determining whether the first probabilities and the stored probabilities match (block 308). In some examples, the determination is whether the first probabilities and the stored probabilities match exactly, which would indicate that no changes to the original data have been made. In other examples, the determination is whether the first probabilities and the stored probabilities match beyond a threshold amount, which would allow for a small amount of deviation from the original data (for example, due to processing errors or the like).

As discussed above, in some examples, there is a temporal order of the point and vacancy detection, which results in point and vacancy detection in a particular order around the space under analysis. In such examples, the determination includes determining whether the temporal order of point and vacancy detection for the first probabilities matches the temporal order of point and vacancy detection for the stored probabilities.

When the first probabilities are determined to match the stored probabilities, the method 300 proceeds with verifying that the data is unchanged (block 310). In some examples, the device proceeds with using the data as intended in response to the determination that the first probabilities match the stored probabilities. In some examples, the user of the device or a system administrator is notified that the data is unchanged.

When the first probabilities are determined not to match the stored probabilities, the method 300 proceeds with providing a notification that the data is changed (block 312). It is important to note that the lack of matching could be due to a different location of a point in the spatial representation, an additional point (missing vacancy) that is not found in the 3D mutated image generated from the original data, different characteristics of the points that are included in the spatial representation, or the like. In some examples, the notification is provided to the user of the device. In some examples, the notification is provided to a system administrator. The notification can be auditory, visual, or a combination. It should be understood that any mechanism for providing the notification could be used.

In some examples, when it is determined that the first probabilities do not match the stored probabilities, the data is stopped from being used by the device for its intended purpose. For example, if the data includes software code, the software code will not be executed by the device in response to the determination that the first probabilities do not match the stored probabilities. In some examples, the data can be sent to a system administrator or other entity for evaluation and analysis to determine the changes made to the original code, the person that made the changes, etc. In some examples, if the watermarked points (having a different color than the unwatermarked points in the 3D mutated image) are missing or modified, then there can be more confidence that the change was intentional and malicious rather than an accident or glitch.

Figure 4:
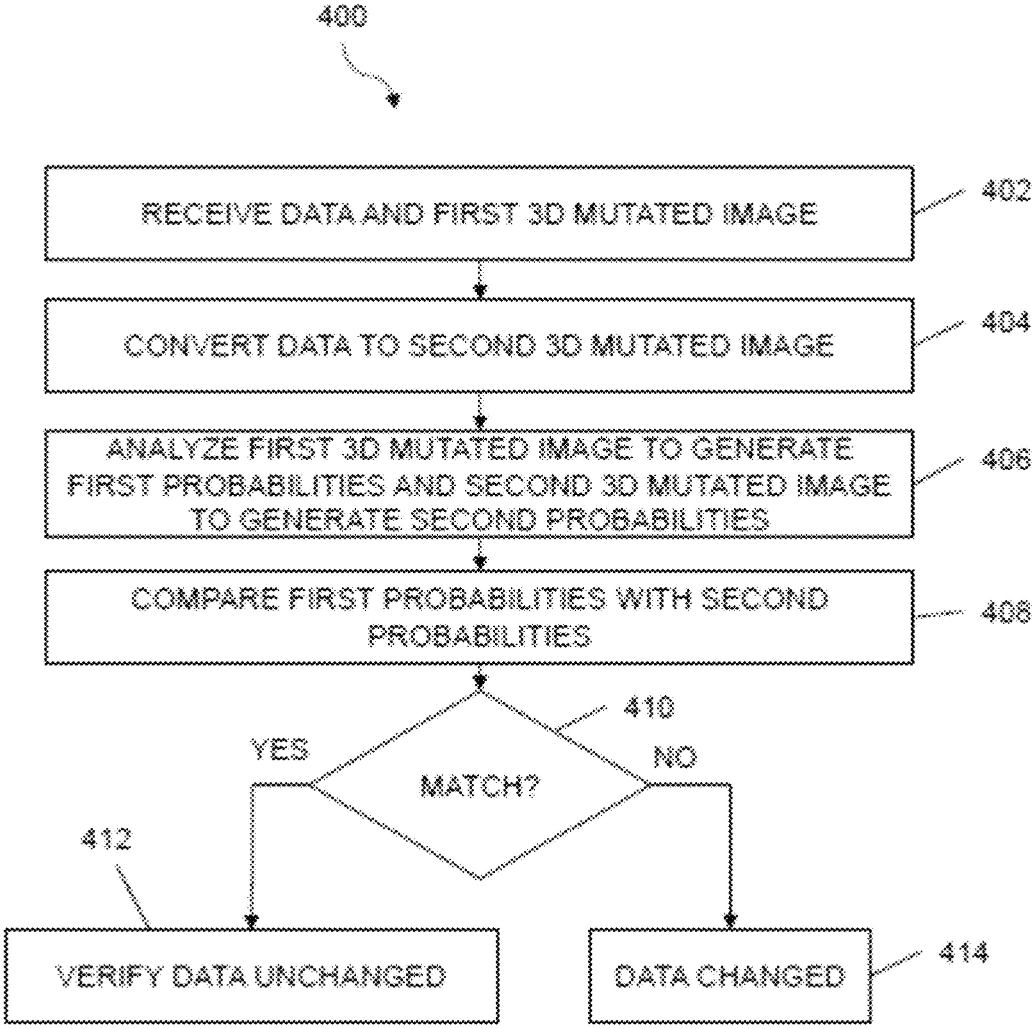
FIG. 4 is a flow diagram of another example method of data verification.

FIG. 4 is a flow diagram of an example method 400 of verifying whether data received by a device has been changed. The method 400 can be performed by a device whenever the data is received from another device or as a condition for using the data to ensure that the data image, and therefore the data itself, has not changed.

The method 400 includes receiving data and a first 3D mutated image from a different device (block 402). The data and first 3D mutated image can be received from the different device via wired or wireless communication. In some examples, a master device is configured to collect the full PUF outputs for a MEMS module (including, for example, a MEMS based PUF and TRNG) in each device of the system that is part of an exclusive user community. In such examples, the master device is configured to generate a first 3D mutated image for data using a PUF output or other characteristic unique to the respective devices. When transmitting data to a particular device, the data will be transmitted along with the respective 3D mutated image. In some examples, the first 3D mutated image is associated with the particular device that the data is being sent to. In other examples, the first 3D mutated image is associated with the different device that is sending the data and the PUF output used for the analysis in block 406 can be provided, or determined, as well. For example, the PUF output can be provided or determined during machine-to-machine provenance verification. In some examples, the first 3D mutated image and/or the PUF output can be encrypted using symmetric and/or asymmetric encryption methods for an exclusive community of users.

The method 400 further includes converting the received data to a second 3D mutated image (block 404). The techniques for converting data to a 3D mutated image are discussed above with respect to block 102, block 104, and block 106. In some examples, the device generates the 3D mutated image using same processes, random numbers, etc. that were used to create the first 3D mutated image from the original data. In some examples, information regarding the processes, random numbers, etc. used to generate the first 3D mutated image from the original data are also provided to the device by another entity (for example, a master device) after a verification process is performed and then the device can store the information in a memory of the device.

The method 400 further includes analyzing the first 3D mutated image to generate first probabilities and analyzing the second 3D mutated image to generate second probabilities (block 406). In some examples, analyzing the first 3D mutated image and the second 3D mutated image according to block 406 is similar to the analyzing discussed above with respect to block 108. The same processes, density function, etc. are used by the device to analyze the first 3D mutated image and the second 3D mutated image.

The method 400 further includes comparing the first probabilities with the second probabilities (block 408) and determining whether the first probabilities and the second probabilities match (block 410). In some examples, the determination is whether the first probabilities and the second probabilities match exactly, which would indicate that no changes to the original data have been made. In other examples, the determination is whether the first probabilities and the second probabilities match beyond a threshold amount, which would allow for a small amount of deviation from the original data (for example, due to processing errors, transmission errors, or the like).

As discussed above, in some examples, there is a temporal order of the point and vacancy detection, which results in point and vacancy detection in a particular order around the space under analysis. In such examples, the determination includes determining whether the temporal order of point and vacancy detection for the first probabilities matches the temporal order of point and vacancy detection for the second probabilities.

When the first probabilities are determined to match the second probabilities, the method 400 proceeds with verifying that the data is unchanged (block 412). In some examples, the device proceeds with using the data as intended in response to the determination that the first probabilities match the second probabilities. In some examples, the user of the device or a system administrator is notified that the data is unchanged.

When the first probabilities are determined not to match the second probabilities, the method 400 proceeds with providing a notification that the data is changed (block 414). In some examples, the notification is provided to the user of the device. In some examples, the notification is provided to a system administrator. The notification can be auditory, visual, or a combination. It should be understood that any mechanism for providing the notification could be used.

In some examples, when it is determined that the first probabilities do not match the second probabilities, the data is stopped from being used by the device for its intended purpose. For example, if the data includes an update for firmware, the firmware update will not be implemented by the device in response to the determination that the first probabilities do not match the second probabilities. In some examples, the data can be sent to a system administrator or other entity for recordation, evaluation, and analysis to determine the changes made to the original firmware update, the person that made the changes, etc. In some examples, if the watermarked points (having a different color than the unwatermarked points in the 3D mutated image) are missing or modified, then there can be more confidence that the change was intentional and malicious rather than an accident or glitch.

In some examples, in addition to (or instead of) receiving a first 3D mutated image from another device, the device may receive first probabilities for the first 3D mutated image generated from the original data. In some examples, a master device is configured to collect the full PUF outputs for a MEMS module (including, for example, a MEMS based PUF and TRNG) in each device of the system that is part of an exclusive user community. In such examples, the master devices configured to generate a 3D mutated image for data using a PUF output and to generate first probabilities for each device using the PUF output or other characteristic unique to the respective devices as part of the density function for the analysis. When transmitting data to a particular device, the data will be transmitted along with the respective 3D mutated image and/or the respective first probabilities associated with the particular device that are generated from the original data. In some examples, the first 3D mutated image and/or the respective first probabilities can be encrypted using symmetric and/or asymmetric encryption methods for an exclusive community of users.

While FIGS. 3-4 above are described as methods for verifying whether data has been changed, it should be understood that similar techniques can also be used to determine whether the data stored on or received by a device is the correct version. For example, respective mutated 3D images and probabilities for each version of software can be generated and used for verification of the software version on a device in a manner similar to that described above with respect to FIGS. 3-4. If the probabilities for the 3D mutated image generated from the software on a device do not match the probabilities for the 3D mutated image for the correct software version, then it can be determined that the software on the device needs to be updated. In some examples, a notification can be sent to the user of the device and/or a system administrator to update the software for the device in response to a mismatch.

An example use case for the data protection through randomized spatial imaging techniques is for cybersecurity and particularly for reducing the burden on an analyst that is assigned to determine anomalies in data such as, for example, software code, images, or the like. It should be understood that the particular data that can be represented using the spatial maps are not limited to the examples described herein and can apply to a wide variety of additional applications and use cases.

An example application for the techniques described above is real-time ballot and voting data integrity. In some examples, the image generated by voting machines can be imaged and processed through the methods described above. This can provide integrity and provenance of the ballot forms used in the election. Further, this can provide a real-time voting record that does not violate privacy of the voter but tracks any unwanted changes or changed votes from the moment the first vote is cast to the time the full election results are archived. In some examples, the system is configured to immediately track when and where the record has been changed through watermarks and forensics can be applied with high integrity.

Another example application for the techniques described above is medical applications and particularly for mapping the brain. In some examples, an initial high-resolution mapping distribution can be generated and the imaging and analysis techniques described above can be applied. The patient can be tested for various activities that target areas of the brain where there may be a concern (inflammation, weak blood vessels, thermal dead zones, etc.). Real-time analysis of millions and millions of brain cells can be characterized in very short, staggered assessments enabling analysis at a level not yet achieved to date.

Another example application for the techniques described above is high-density flying vehicle traffic management. High resolution, real-time analysis of 100,000s of flying vehicles (commuting, transport of goods at a port of entry, etc.) and high-risk management of forthcoming high-density airborne commuter traffic, port area distribution of goods and services can be implemented. Proficiencies needed for these new, emerging transportation systems are achieved through use of instant frame by frame imaging and application of the processes described above.

Another example application for the techniques described above is management and analysis of world-wide financial transactions. Management of all electronic transactions in global financial markets (more $14 quadrillion dollars per year) could be a devastating disabler of graft and corruption. With full protection of the identity of the client, trillions of dollars in daily transactions can be monitored with AI for identifying large anomalies that would require further investigation (for example, stop most of the $283 million dollars are lost through electronic fraud each day). Proficiencies and privacy/IP protections can be enabled through use of instant frame by frame imaging and application of the processes described above.

Others example applications for the techniques described herein can include management of power grid networks (for example, restoration of last known good balance between transfer stations), food and water resources, supply chain, corporate inventory, Security Exchange Commission (SEC) integrity, and the like.

While specific use cases and example applications are discussed above, it should be understood that the techniques described above are not limited to the examples described herein and can apply to a wide variety of additional applications and use cases.

By using the techniques described above for randomized spatial imaging and analysis, it can be verified whether data has changed from the original data in an efficient manner. The techniques can also enable detection of particular changes, even if subtle, through the use of strategic watermarking that identifies particularly important or vulnerable portions of data. The techniques described above can benefit microelectronics, software companies, EDA Tool providers, digital engineering Reference Architectures and full-scale digital transformation domains around the globe.

By utilizing the 3D mutated images and probability analysis, the techniques described herein can execute data integrity verification in a manner that is more efficient in terms of time of execution, storage demands, and power demands compared to previous techniques. The techniques described herein can be used to verify terabytes of data (including software code, images, algorithms, etc.) in an accelerated manner that enables 24/7 continuous monitoring and data integrity verification whereas this was infeasible using previous techniques due to the time, storage, and power demands required.

Digital Field of View

Current cryptographic processes rely on basic building block algorithms that get called by modes of operation and higher-level processes to address an ever-changing number of unique applications. State of the art cryptographic methods provide the means to transform digital data between intelligible plain text and unintelligible cypher test forms as the means to maintain data confidentiality and integrity, validate data authenticity cryptographic techniques, and offer the use of collision free one-way functions such as hash algorithms that use the digital data as input and provide an exact number for the data. Collision free means that no two files will give the same number. An example application of a hash function is as follows, if digitally stamping a file (digital file image), the digital bytes are run through a hashing process to generate a hash digest value from a message to protect. The image is then validated by repeating the hash process and comparing to the expected hash digest value. An example hash function is the Secure Hash Algorithm (SHA).

To maintain integrity, the party performing authentication must be able to independently validate the hash digest value. That is, without having access to the hash value via a trusted source, the authenticating party would not have assurance that the file is authentic because the security premise is only that the hash routine can be repeated, and the hash digest compared. The HMAC (Hash-Based Message Authentication Code) algorithm uses a hash function and a secret variable to verify the integrity and authenticity of data files. Use of HMAC must work in collaboration with the means to securely share confidential variables. The exchange of confidential variables is often performed using asymmetric cryptography employing digital certificates to securely share confidential variables between parties.

While digital cryptographic processes are effective for maintaining the integrity and confidentiality of files, the scale of digital transformation brings additional challenges that cannot be resolved by existing methods alone. In particular, as data sets get larger, new methods are needed to securely manage digital configurations. Further, maintaining integrity in a digital environment is challenging for a number of reasons, including: a central authority may be infeasible; the digital environment is dynamically and constantly changing; the environment must maintain interoperability and backwards compatibility; the digital environment may include proprietary commercial software or service elements; and it is costly to verify elements are to be trusted in the first place even with open source, someone must ensure the opensource is free of threats.

Though traditional methods of cryptographic authentication are the foundation of data validation at the application module level, as the amount of information becomes larger and more modules are incorporated, the use of hash functions becomes unreliable due to the likelihood that some change will occur ahead of the means to validate them (for example, due to the propagation delay of the corresponding hash digest values). Failure to resolve an item could result in denial-of-service failures to the system as a whole. Digital environments will frequently change due to updates to versions of software, inclusion or removal of elements, patches, etc. Methods are needed to manage the ever-increasing volume of data critical for the digital transformation.

The examples described herein include techniques for organizing and managing large data sets while maintaining data integrity. In particular, the techniques described herein use spatial representation of data and relationships (referred to herein as the "digital field of view") to provide an efficient framework for real-time data and asset integrity verification management without sacrificing the quality of service. The techniques described herein allow for validation of the digital field of view while accounting for the necessary and constant change within the digital field of view. The digital field of view representation can represent data, devices, assets, or the like in a way that allows the information to be organized, retrievable, and detectable. The types of data that can be represented, analyzed, and managed spatially are not limited. The techniques described herein can be used to group, track, and manage a large amount of information while also making it intuitive to analyze. In other words, the techniques described herein enable maintaining integrity like current cryptographic techniques but provide the needed flexibility for managing and analyzing larger data sets that current methods do not provide.

Figure 6:
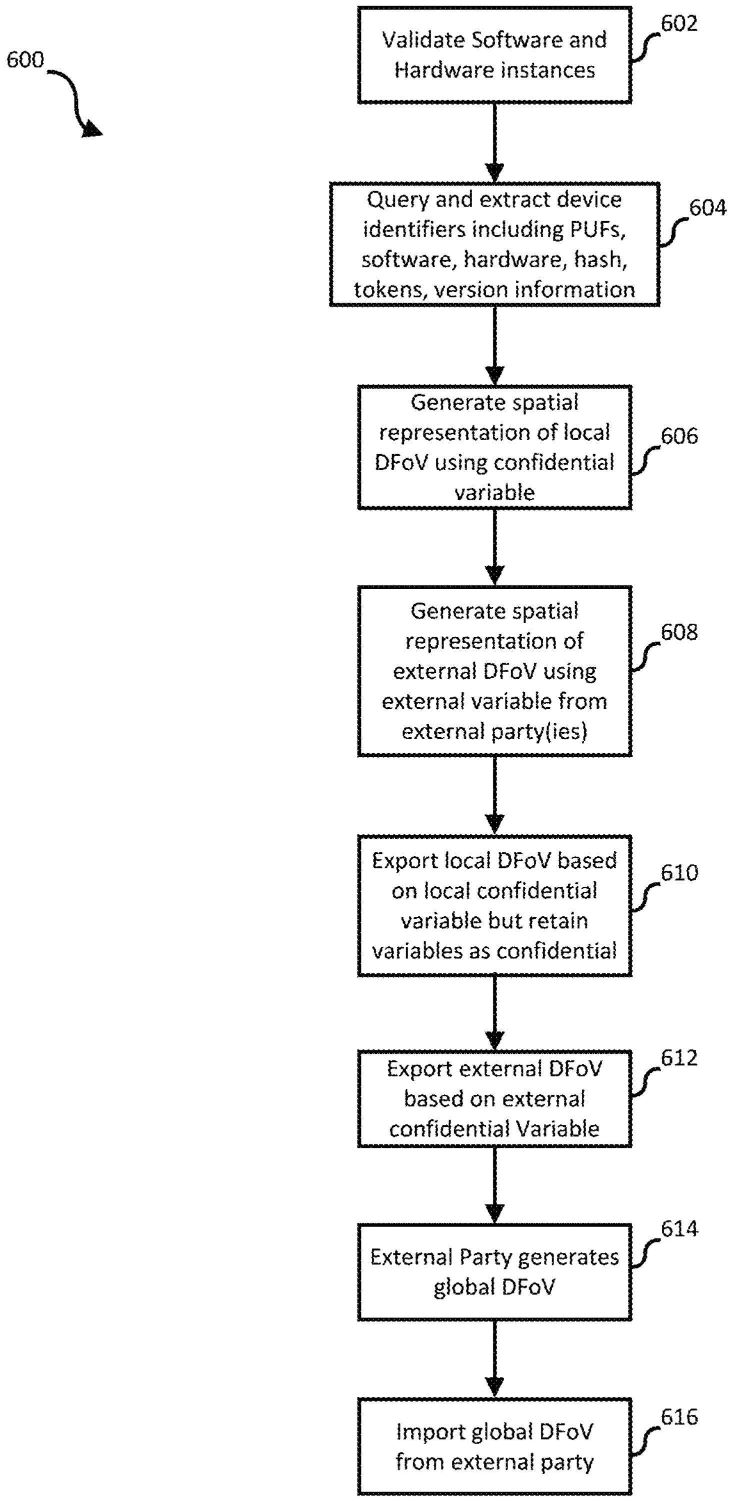
FIG. 6 is a flow diagram of an example method of validation and sharing of view information.

FIG. 6 is a flow diagram of an example method 600 of validation and sharing of view information for devices in a system. The blocks of the flow diagram in FIG. 6 have been arranged in a generally sequential manner for ease of explanation; however, it is to be understood that this arrangement is merely exemplary, and it should be recognized that the processing associated with method 600 (and the blocks shown in FIG. 6) can occur in a different order or where at least some of the processing associated with the blocks is performed in parallel in an event-driven manner.

The method 600 includes validating software and hardware instances (block 602). In some examples, validating software and hardware instances includes using current techniques. In other examples, the techniques described above for random spatial imaging and analysis can be used for validating software and hardware instances. A combination of techniques could also be used for subsets of the devices.

The method 600 further includes obtaining device identifiers (block 604). In some examples, obtaining device identifiers includes using PUFs. In some examples, obtaining device identifiers includes using software. In some examples, obtaining device identifiers includes using hardware. In some examples, obtaining device identifiers includes using hash tokens. In some examples, obtaining device identifiers includes using version information. A combination of techniques could also be used for subsets of the devices.

The method 600 further includes generating a spatial representation of a local digital field of view using a confidential variable (block 606). In some examples, the generating a spatial representation of a local digital field of view includes generating a 3D representation similar to the individual views shown in FIG. 7A. In other examples, since the spatial representation of the local digital field of view is virtual, the representation can be generated in higher dimensions than 3D (for example, 4D, 5D, or beyond) depending on the resolution and information desired for the application. The local digital fields of view (View 1, View 2, View 3 in FIG. 7A) are partial views of the universal digital field of view shown in FIG. 7B. In some examples, the local digital field of view is generated by an individual device and provides information related to itself and its nearest neighbors or one or more digital landmarks defined in the digital universal field of view. In some examples, the local digital field of view is generated by an authority or entity that receives information for a subset (less than all) of devices, assets, or the like of the digital environment. In some examples, the spatial representation is generated using the confidential variable (for example, output of the local PUF module that is generated by the device or entity).

In some examples, generating the spatial representation of a local digital field of view using a confidential variable also includes analyzing the data using a spatial point process or similar process to provide probabilities of finding points and vacancies in the 3D representation. The process can be similar to that described above with respect to block 308 and block 406. Such processing can create an abstraction layer that can be used to efficiently form a persistent "fuzzy" digital field of view representation (similar to those shown in FIGS. 5C-5D). The fuzzy digital field of view representation unlike hash values can tolerate change and then be used by an intelligent algorithm that is trained or programmed to detect anomalies. In some examples, the data validation information description is organized in the form of a special point process map, which can be used to represent details such as the types of assets and corresponding relationships as a spatial map.

The method 600 further includes generating a spatial representation of an external digital field of view using an external confidential variable from one or more external parties (block 608). In some examples, the generating a spatial representation of an external digital field of view is similar to the approach discussed above with respect to block 606, but the confidential variable used to generate the spatial representation is provided by one or more external parties rather than the device itself.

The method 600 further includes exporting the local digital field of view based on the local confidential variable (block 610). The local confidential variable is retained as confidential by the device or entity. In some examples, cryptographic techniques such as, for example, checksums or hashes, can be used to facilitate an exchange of the local digital field of view.

The method 600 further includes exporting the external digital field of view based on the external confidential variable (block 612). The external confidential variable was provided to the device or entity, so the external confidential variable is known to multiple devices and can be retained as confidential between those devices. In some examples, cryptographic techniques such as, for example, checksums or hashes, can be used to facilitate an exchange of the external digital field of view.

The method 600 further includes generating a global field of view (block 614). In some examples, an external party is configured to aggregate the local (and external) digital fields of view and combine them into a global (universal) digital field of view similar to the 3D representation shown in FIG. 7B. In some examples, the external party is configured to combine the local (and external) digital fields of view using digital markers such that the digital fields of view can be oriented into the same axes.

The method 600 further includes importing the global digital field of view (block 616). In some examples, the external party is configured to output the global (universal) digital field of view to one or more devices in the system such that those devices can have access to a larger digital field of view on an as needed basis.

Figure 7A:
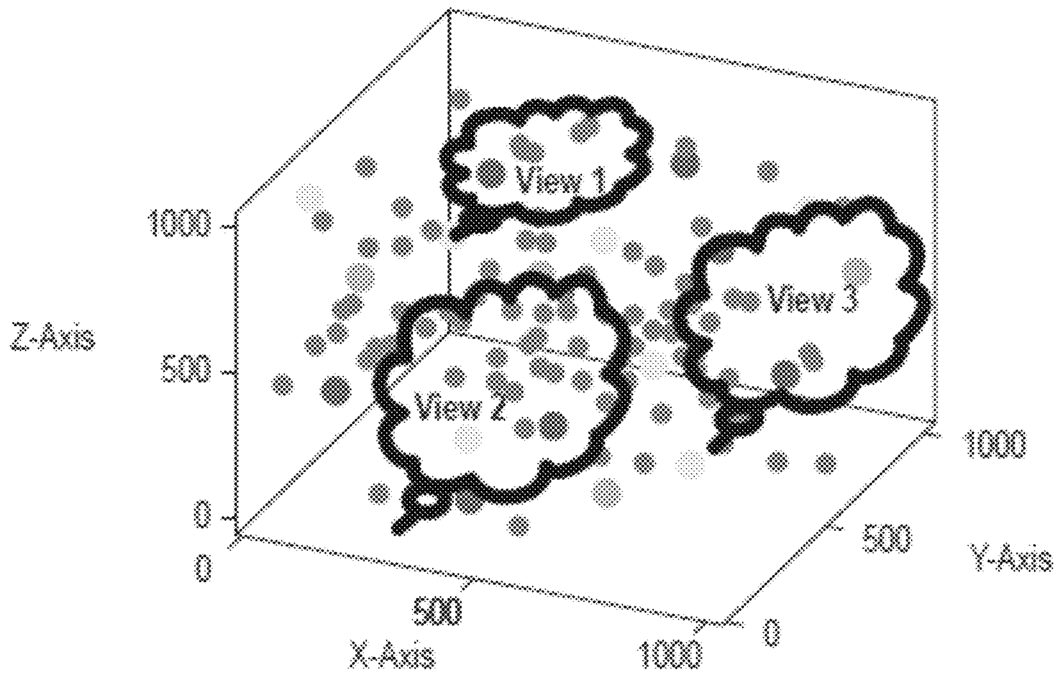
FIG. 7A is an illustration of a universal digital field of view.
Figure 7B:
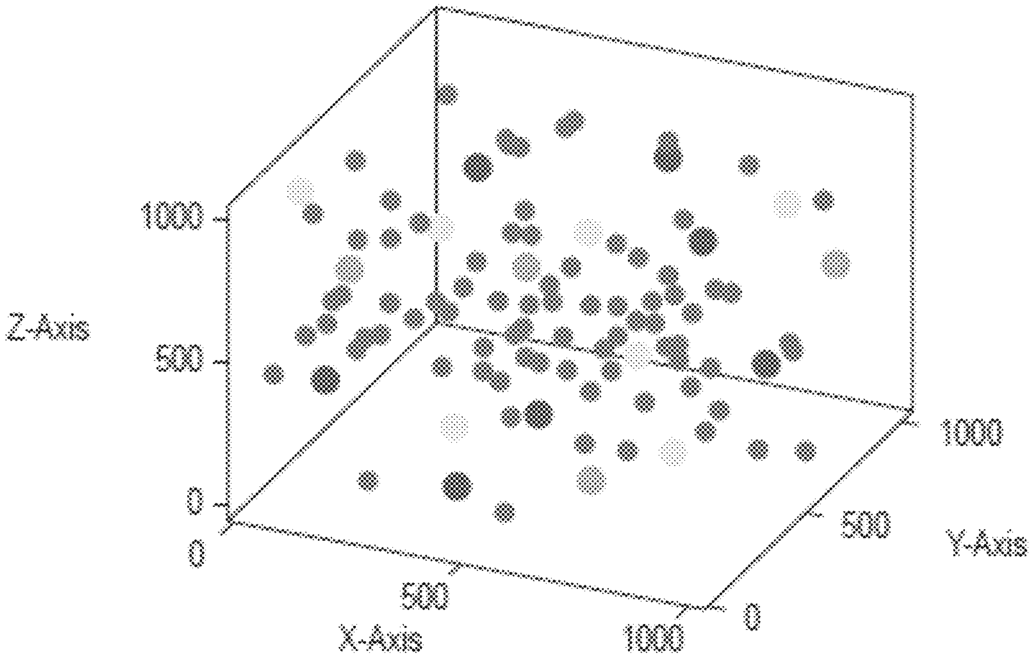
FIG. 7B is an illustration of several digital fields of view for different authorities.

As discussed above, FIGS. 7A-7B illustrate diagrams of example digital fields of view. In particular, FIG. 7A is an illustration of several digital fields of view for different authorities, and FIG. 7B is an illustration of a universal digital field of view. The spatial representation approach provides an efficient means to represent and organize many objects and ascribe meaning to them. These views can be used to represent a wide variety of different data as a spatial map.

An example use case for the digital field of views is where the views are used to represent battlefield assets. In such examples, the positions of a point on the X-axis, Y-axis, and Z-axis can be used to represent different characteristics of the battlefield assets being represented. In some examples, the color of the point, size of the point, etc. can also be used to convey further characteristics of the assets in the battlefield. In one example, the position of a point on the X-axis and the Y-axis can be used to represent the latitude and longitude of an asset in a battlefield and the position of the position on the Z-axis can be used to represent the type of asset such that all assets of a particular type are in the same range on the Z-axis. It should be understood that other characteristics of the battlefield assets could also be represented using the digital field of view other than those described above, and the particular characteristics can be selected to those desired for the particular application.

Another example use case for the digital field of views is where the views are used represent devices at a company. In such examples, the positions of a point on the X-axis, Y-axis, and Z-axis can be used to represent different characteristics of the devices being represented. In some examples, the color of the point, size of the point, etc. can also be used to convey further characteristics of the devices. In one example, the position of a point on the X-axis can represent an age of the device, the position of the point on the Y-axis can represent a version of a software currently installed on the device, and the position of the point on the Z-axis can represent a location (for example, building number) of the device. It should be understood that other characteristics of devices in a company could also be represented using the digital field of view other than those described above, and the particular characteristics can be selected to those desired for the particular application.

Another example use case for the digital field of views is where the views are used to represent and track aircraft. In such examples, the positions of a point on the X-axis, Y-axis, and Z-axis can be used to represent different characteristics of the aircraft being represented. In some examples, the color of the point, size of the point, etc. can also be used to convey further characteristics of the aircraft. In one example, the position of a point on the X-axis can represent a fuel level of the aircraft, the position of the point on the Y-axis can represent a length of flight, and the position of the point on the Z-axis can represent an altitude of the aircraft. It should be understood that other characteristics of aircraft could also be represented using the digital field of view other than those described above, and the particular characteristics can be selected to those desired for the particular application.

Another example use case for the digital field of views is where the views are used to represent and analyze surveillance and/or security data. In such examples, the positions of a point can be used to represent different characteristics of features in images taken using a security camera, satellite, or the like. For example, the positions of the point can be used to represent the physical position of features as well as identifying information for the features (for example, type of feature, threat level, etc.). It should be understood that other characteristics of features could also be represented using the digital field of view other than those described above, and the particular characteristics can be selected to those desired for the particular application.

It should be understood that the particular data that can be represented using the spatial maps are not limited to the examples described herein and can apply to a wide variety of additional applications and use cases.

Figure 8:
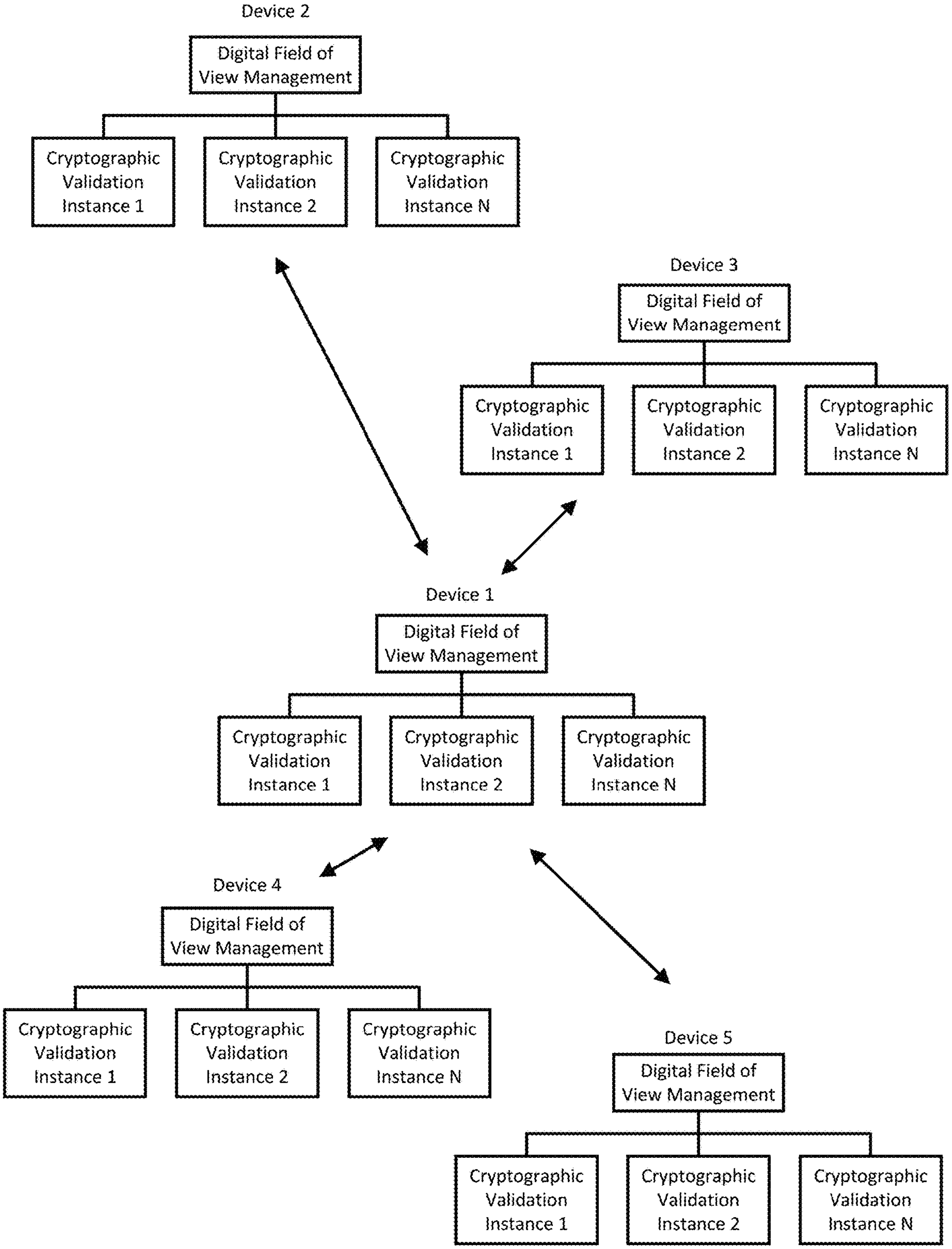
FIG. 8 is a block diagram of an example system.

FIG. 8 is a block diagram of an example system that includes five devices. In the example shown in FIG. 8, Device 1 is related to, and communicatively coupled with, four other devices. While five devices are shown in the example shown in FIG. 8, it should be understood that any number of devices can be included in the system.

In the example shown in FIG. 8, each device is configured to validate the contents or data on that device using the cryptographic validation instance(s). Each device in the example shown in FIG. 8 is configured to create a trusted exchange. In some examples, each respective device is configured to create a digital field of view that has that device at the center of the view, for example, via the digital field of view management functions. In such examples, the device is configured to use its digital field of view to validate the health and integrity of its environment.

In some examples, the digital field of view management function is deployed as a module on the devices. In some examples, the digital field of view management function is a software application that's operation is virtualized to the point where it is hardware agnostic and can applied to existing hardware and software platforms. The particular hardware and software of the devices can be dependent on the desired application and role for the device in the system.

It is desirable to avoid over installing too much functionality on the devices, if possible. In some examples, the digital field of view management function is deployed as a lightweight, core application (for example, targeting the particular operating system of the device), and the digital field of view management function is configured to determine whether further add-ons are required for the particular device. In some examples, the digital field of view management function is configured to query the environment or network to determine the type of platform (hardware and/or software) included in the device. Based on the type of platform, the network, and/or the role of the device, the digital field of view management function is configured to download additional features to right-size the application for the particular device. In some examples, the querying is performed in a manner that is transparent to the user.

In some examples, prior to the querying and downloading by the digital field of view management function (or even prior to installing the digital field of view management function itself), one or more authentication processes are performed to verify the credentials of the user or device. The one or more authentication processes can include, but are not limited to, an enrollment process, sign-in using an account profile, entering predefined credentials, entering identifying information, providing a proper PUF output and/or TRNG output, and/or a Trusted Platform Module process.

In some examples, the installation of the digital field of view management function is performed within a high-value or high-level network (for example, at a headquarters) that performs the installation of the digital field of view management function. In some such examples, further validation can be performed using other devices or systems (including neighboring devices). In some examples, the further validation includes communicating with nearest neighbors via BLUETOOTH or other distance limited technology, querying the round-trip delay, and verifying device location based on the round-trip delay. In some examples, the further validation includes attempting to communicate with the nearest neighbors via BLUETOOTH or other distance limited technology and verifying that the device is not in close proximity to the nearest neighbors based on a lack of response. In some examples, the further verification can include physically meeting with devices to validate the device and user. It should be understood that other additional validation techniques could also be used in addition to, or instead of, the techniques described above.

In some examples, after installation and authentication of the user/device, the system is configured to provide rules, boundaries, and behaviors that are specific to the device based on the type of platform (or resource) and the role of the device in the system or network. For example, the rules, boundaries, and behaviors can include rules for where the device is allowed to go, what the device is to do in the event of a failure or detection of nearest neighbor issues, how to detect status, or the like. In some examples, the rules are distributed and updated periodically by at least one authority responsible for the digital fields of view utilized by the system. In some examples, the different groups/authorities responsible for the digital fields of view each provide different rules, boundaries, and behaviors to the devices in the system under the purview of those groups/authorities. In some examples, the rules, boundaries, and/or behaviors for a particular authority can change periodically. For example, the synchronization and timing of communications, sequence of communications, and/or time-based or event-based behaviors can be modified periodically.

The use of defined rules, boundaries, and behaviors can help a system to quickly identify outliers, safety issues, security issues and the like by making it easy to identify a device that is operating in an unauthorized manner. If a device is not following rules, staying within boundaries, or performing expected behaviors, this can indicate that there is an issue with the device that requires further investigation. If anomalous activity is detected, then a notification can be provided to a system administrator or other entity for further investigation. For safety and security issues, a detection of an anomaly for particular levels or types of devices or certain types of violations can be reported to regulators or law enforcement.

A shared, universal digital field of view can be represented spatially allowing a composite view to be formed at a higher level encompassing more devices. In some examples, in order to generate a universal digital field of view, the devices are configured to provide their local field of view information to a central device (for example, a hub or Device 1) that compiles the digital field of view information and combines it into the universal digital field of view.

In some examples, virtual markers are included in the digital field of view to enable devices to orient themselves within the environment represented by the universal digital field of view. In such examples, the central device can use the virtual markers to aid in combining the digital field of view information from each of the devices in the system.

In some examples, the digital fields of view generated by different authorities can be securely shared with each other and compared to facilitate validation and/or corroboration of data in the digital fields of view or changes in the digital fields of view. In some examples, different authorities may utilize different types of digital fields of view. For example, the digital fields of view may have different resolutions (3D vs. 4D), different organization of the data, different parameters captured in the digital field of view, etc. For a global network to operate effectively, interoperability between different digital fields of view is desired. In some examples, boundaries can be used to define where particular rules and behaviors are applicable. Central network devices or network centers can be positioned between authorities or at boundaries and facilitate the secure exchange of digital fields of view as well as translation of digital fields of view across boundaries to accommodate heterogenous devices, rules, and behavior for different authorities.

In some examples, a central network device can be used to match the parameters in the digital fields of view that organize the data differently. The central network device can shift or translate the organization of the data from one digital field of view such that it matches the organization of the data from the other digital field of view. An example of this could be where altitude is organized on the X-axis in one digital field of view and the Y-axis of another digital field of view.

In some examples, a central network device can translate a higher resolution digital field of view into a lower resolution digital field of view. For example, if a first digital field of view captures data in four or five dimensions but the second digital field of view captures data in three dimensions, then the central network device can translate the first digital field of view to have lower resolution.

In some examples, a central network device can virtually recreate a global (or combined) digital field of view for a device using data from multiple digital fields of view. In such examples, a subset of the data used for the global (or combined) digital field of view can be provided by the device (and the authority that provides the device with its rules, boundaries, and behaviors), and the rest of the data is emulated in the digital field of view by the central network device. For example, a global digital field of view can show data for tracking ten assets, but the device (and its authority) is tracking five assets directly where the additional five assets are tracked via network virtualization using the data from other digital fields of view.

In some examples, it can be difficult, and time consuming to verify and validate all changes to data points and vacancies when the data sets are large enough. In order to increase efficiency and save resources, discrepancies and disagreement between different digital fields of view can be used to focus efforts for further verification and validation techniques (for example, using traditional techniques) to determine which data is correct. For example, if two digital fields of view are compared and there is a difference between characteristics of the same point representing a device in different digital fields of view, the system can identify the discrepancy and trigger a more thorough investigation into the status of the device. In some examples, the presence of a difference in the characteristics for the same point can indicate a potential anomaly or issue with the device. In some examples, changes that are consistent across multiple digital fields of view can be assumed to be valid when the authorities for the digital fields of view are trusted.

An example application for the system shown in FIG. 8 could be for economic analysis. For digital currencies (or fiat currencies), global information is used to calculate relative exchange rates, which can change in a rapid manner depending on the circumstances. In some circumstances, there could be significant changes that could change behavior if the actor was made aware of the changes in a timely manner. For example, a buyer may not wish to proceed with a purchase, or a company may not wish to place an order due to a change in the exchange rate. An early warning of such changes could be invaluable in such an agile environment.

In some examples, the techniques described herein can be used to generate digital fields of view to represent different characteristics of financial conditions, exchange rates, currency rates, economic data, and the like. Each authority for a different digital field of view can be, for example, a different official publication or verified source of economic information, and a verified community of users/devices can be established to securely share the economic data that is captured in the different digital fields of view.

In some examples, one or more devices in the system include functionality that is configured to estimate relative exchange rates (or changes to relative exchange rates) based on the economic data in the digital fields of view. Since the data can be quickly distributed and analyzed using the techniques described herein, the devices in the system can obtain independent economic data and project changes is exchange rates, interest rates, or the like based on authenticated data provided in an exclusive user community. This information can be disseminated to devices (for example, applications operating on cell phones) and used or audited by any device in the system. This type of system could be particularly beneficial for point of sale and decisionmaker reference.

Another example application for the system shown in FIG. 8 could be for digital voting. For current voting systems, vote counting can be difficult to verify due to human error, and verification requires recounting ballots. For current electronic voting systems, there are concerns about validating the information because the source of the data is not always available.

In some examples, the techniques described herein can be used to generate digital fields of view to represent voting at various levels of granularity. Each authority for a different digital field of view can be, for example, a different level of elections (for example, precinct, district, county, state, country), a different political party, or the like. In such examples, each voter is authenticated or verified digitally prior to being able to cast votes, and the voting information is retained in the data captured in the digital fields of view.

In some examples, a voting system utilizing digital fields of view can provide the tools for independent validation by any device in the user community without the need for manual recounting of ballots. All of the data can be made available through the digital fields of view in order to tally votes, confirm the absence of voter fraud, and verify identities of the individuals that have cast the votes. If discrepancies are detected between different digital fields of view, this can provide a means for focusing resources for further validation and investigation.

Use Case: Digital Field of View Applied to a Design Environment

The DFoV is a technology for protecting Integrated Circuit (IC) supply chain targets like microelectronics lifecycle data, software code and other early design phase artifacts at rest or in transit, monitoring the design environment without interfering with development team activities. To combat persistent threats, including insider threats, the system must persistently monitor changes and identify the threats. Embodiments of the DFoV system will monitor and detect changes to design flow work products, watermark the material, and develop a statistical representation that can be used to evaluate changes and to calculate the probability that a given change is malicious. By being autonomous, embodiments of the DFoV system offer the means to transparently track changes as designers and tools generate work products, and the ability to create remote backups and the recreation of the design in a remote trusted environment. Design recreation in the remote trusted environment offers the means a) to prevent data loss, b) to achieve design recovery, and c) to perform trusted offline independent validation. When chained together such that all multiple development parties have DFoV compliance connectivity, it can be used to confirm the integrity across the entire development supply chain. The DFOV account for third party inputs via controls and verification requirements enforced by software to control inputs and to mandate that Intellectual Property (IP) being introduced into the environment have been independently verified or authenticated by an authorized or trusted source.

Figure 9:
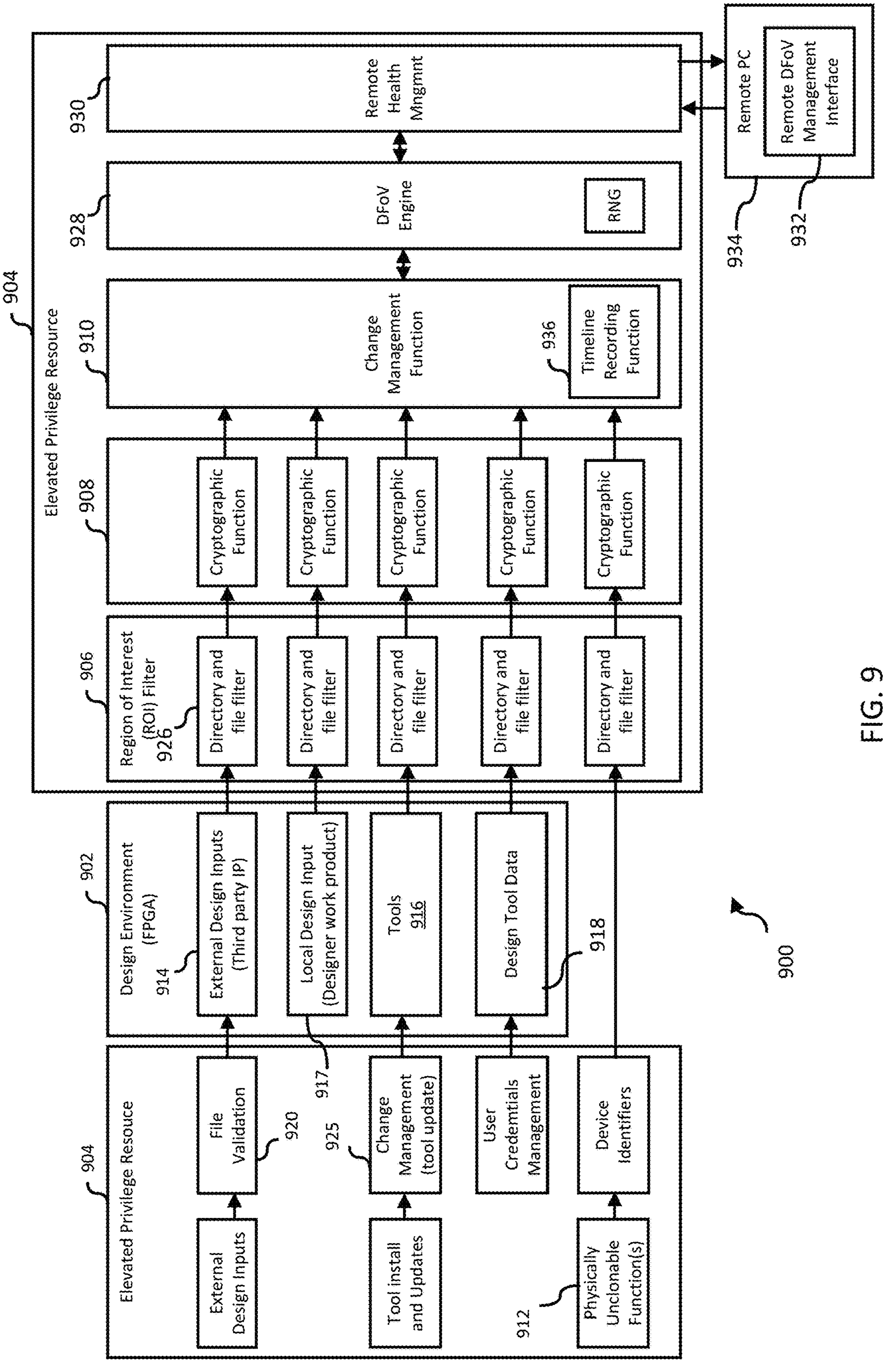
FIG. 9 is a block diagram of a system that uses Digital Field of View to provide data integrity verification for a design environment according to one embodiment of the present invention.

FIG. 9 is a block diagram of a system 900 that uses Digital Field of View (DFoV) to provide data integrity verification for a design environment 902 according to one embodiment of the present invention. In one embodiment, design environment 902 includes functionality (described below) to enable a user to design and program a Field Programmable Gate Array (FPGA). It is understood that the use of the DFoV to provide data integrity verification for the design environment for an FPGA in this embodiment is provided by way of example and not by way of implementation. In other embodiments, DFOV can be used to provide data integrity verification with respect to other data that could be subject to an insider threat, e.g., software code, tools such as visual programming tools, Computer-Aided Drafting and Computer-Aided Design and Drafting (CADD) tools, images such as from digitized output of a sensor, digitized drawings, digitized data, and text.

In this embodiment, DFOV has been developed to autonomously establish real time evaluation of digital design artifacts and to communicate the real time status to a trusted source. DFOV has specific application to the objectives of Evidence-Based-Assurance by rendering a quantitative, pertinent scoring tool to critical artifacts produced throughout the design phase of software, firmware, and microelectronics life cycle.

For purposes of this application the term "artifact" as applied to digital field of view means any data associated with a device that exists, at rest or in transit, at a selected point in time. Further, in the context of a design environment, a "design artifact" means any data input to, output from, or generated by the design environment that exists, at rest or in transit, at any time during the design process. "Data," from the design perspective, covers:

1. What is produced in all levels of systems design requirements (Operational, Functional and Architectural). e.g., image-based representations of the Concept of Operations that explain how a system will work and what it will provide, Software System Requirements, the Information Technology drawings, etc.
2. All forms of software code, applications code, configuration management code, and related software proficiency/security applications.
3. All anticipated edge sensing data collected for the design of a virtual model in a digital twin, this also includes test design and the design of the physical half of the digital twin with all code.
4. All the computer aided design input, intermediate, or output files from the design process, including trades studies, requirements, source code, source code listings, object code listings, schematics, design specifications, algorithms, processes, flow charts, formulae, etc.
5. A collection of data recorded in a form capable of being processed by a computer (computer database)
6. Recorded information, regardless of the form or method of the recording, of a scientific or technical nature (technical data).

This definition of data is equally applicable to the section above under the heading "Data Protection Through Randomized Spatial Imaging."

DFoV is implemented in the embodiment of system 900 through elevated privilege resource 904. In one embodiment, elevated privilege resource 904 is a software function that runs on computing platform such as a computer, server or the like. Elevated privilege resource 904 includes the following functions:

1. a region of interest (ROI) filter 906 that selects what are the areas of design artifacts to monitor, folders, files, user changes, and the like, 2. cryptographic function 908 that performs tasks such as hash tagging of files and folder contents and encrypt, decrypt and authentication of critical processes as well as compressing select artifacts for archival and remote validation,
3. change management function 910 that uses file information along with hash tags to generate a statistical representation that highlights areas of change in the design artifacts and flags threat probability based on context as well as providing a timeline recording,
4. physical unclonable function 912 (PUF 912) provides validation to establish and maintain the identity of the design environment's physical location.

In other embodiments, elevated privilege resource 904 also includes a module that implements threat scoring which may be implemented as part of change management function 910. The threat scoring uses the statistical representation to detect the probability that observed changes are legitimate, non-malicious changes.

Embodiments of system 900 may be implemented on commercial computer hardware. System 900 is capable of autonomously tracking changes to a design environment throughout the design cycle without design team input. System 900 is tailorable to select and monitor specific file directories and files within the development flow, and to securely transmit changes and allow for remote reconstruction of the entire design flow on a remote trusted system, such as remote PC 934. System 900 employs hash techniques combined with a technique to map the collection of hash data into a statistical representation that allows for high level identification of system change along with rules that can use such a representation to automatically detect abnormalities.

System 900 includes design environment 902, which in one embodiment is a design environment for an FPGA in which code is written for the programmable device. In other embodiments, design environment 902 is implemented in other tool environments such as Application Specific Integrated Circuit (ASIC) or software development tool flows. Design environment 902 includes sources of external input. These external inputs could be used by insiders to introduce threats into the FPGA design. To combat this, elevated privilege resource 904 validates all external inputs before the external inputs are imported into design environment 902.

In the embodiment shown in FIG. 9, design environment 902 receives two external inputs. First, design environment 902 receives external design inputs (with Hash and Checksum) from third parties at external design input 914. This could include third party IP. Additionally, design environment 902 could import tools and update with verification data for tools 916 (including, e.g., license, tool version and installation) into design environment 902 for use by the user of design environment 902 (the designer). Additionally, tools 916 create design tool data 918 as the designer provides input to the tools 916 such as configuration files, input design files, etc. Tools 916 then processes the input and creates databases and other outputs necessary for the design. In addition to the external inputs, design environment 902 also allows for local design input 917, e.g., the work product of the user of design environment 902. Each of these inputs (external and internal) provides the basis for the design artifacts that can be tracked by system 900.

As mentioned, elevated privilege resource 904 validates all external design inputs prior to import into the design environment 902. Specifically, elevated privilege resource 904 includes file validation function 920 that provides data integrity verification, e.g., it verifies that the file is from a trusted source and will not introduce any threats into the FPGA design. In embodiments of elevated privilege resource 904, file validation function 920 operates under user control by parties with elevated privileges to set up the parameters of what external inputs are allowed into design environment 902. Designers operate in the design environment 902, users with elevated privileges operate in the elevated privilege resource 904 to access controls to update rules that go into validation, for example, or implementing change management.

To get a new tool into design environment 902, a user would have to provide authentication information at an elevated privilege level through change management function 925 to get a new tool installed and running in the design environment 902.

Elevated privilege resource 904 includes a "region of interest" (ROI) filter 906 that defines what design artifacts are to be monitored by elevated privilege resource 904. ROI filter 906 includes a directory and file filter 926 for each component in design environment 902. Each directory and file filter 926 receives data from a corresponding part of design environment 902 and highlights possible design artifacts of interest.

One challenge for elevated privilege resource 904 is the high volume of data regarding changes in the design environment 902 during the process of FPGA design. Thus, a strategic decision may be made not to monitor those aspects of the data that are changing with too high a frequency and focus on locking down the pieces that are firm and consistent. Advantageously, using the DFoV, elevated privilege resource 904 can detect malicious behavior by selectively looking at data related to changes in the design environment that have a tendency to show the malicious behavior. Advantageously, ROI filter 906 defines aspects of the design environment that are intended to be monitored. Changes in an element of design environment 902 are queued into the corresponding directory and file filter 926 of ROI filter 906.

Elevated privilege resource 904 also includes a cryptographic function 908 that receives outputs from corresponding directory and file filter 926 of ROI filter 906. Cryptographic function 908 then assigns a hash tag to the data from directory and file filter 926 and compresses select artifacts for archival and remote validation.

Change management function 910 receives the encrypted and compressed output of ROI filter 906. The data from the cryptographic function 908 enables areas of change in the design artifacts to be identified. Change management function 910 constructs a timeline of changes in design environment 902 from the data from cryptographic function 908 using timeline recording function 936.

Embodiments of elevated privilege resource 904 identify changes in design environment 902. Also, embodiments of elevated privilege resource 904 identify specific regions of change that are of interest to enable tracking changes over time so that progress and sequence of change can be tracked. For example, if a change is made to an external design input after the local design input is complete and the tools are already run, then elevated privilege resource 904 can flag that as a potential bad action because a design input should not change after the tools have already been run. Similarly, if a tool is updated after a final output is produced, elevated privilege resource 904 would also flag that as a possible bad action because the change in the tool could make it difficult to reproduce that output. By setting up profiles in change management function 910, elevated privilege resource 904 can flag and identify bad action in design environment 902.

Change management function 910 communicates with digital field of view engine 928 to form a local digital field of view (related to design environment 902 and elevated privilege resource 904 of system 900) and a global digital field of view (related to system 900 in context with other similar systems that are interconnected, e.g., over a network). Digital field of view engine 928 enables production of a representation that highlights areas of change in design environment 902. In one embodiment, digital field of view engine 928 uses the teachings described in the section titled "Data Protection through Randomized Spatial Imaging" above to produce the representation of the changes in the design artifacts. Advantageously, using this technique to represent changes in design artifacts may help differentiate threats.

Elevated privilege resource 904 also includes a remote health management function 930. Remote health management function 930 communicates with other elevated privilege resources associated with other design environments, e.g., see FIG. 8. In one embodiment, the remote health management function 930 streams the encrypted, compressed data to a remote DFOV user management interface 932 on remote PC 934. This could enable the design environment 902 to be recreated on remote PC 934 using this digital field of view platform. This could be used for a secure collaboration environment or secure archival environment for contingency planning. Further, the remote trusted environment will have the ability to monitor and validate the design operations occurring on the development computer, the ability to access design artifacts, and the ability to reconstruct the design environment for independent validation.

In some embodiments, elevated privilege resource 904 includes a user management dashboard interface that is used to define directory and file filter 926 of ROI filter 906, hash, encrypt and compression aspects of cryptographic function 908, filters for change management function 910, and provides local DFoV representation for test and debug.

The digital field of view approach described herein allows for distributed participation in the system integrity. In the examples described herein, each device has the ability to participate in its digital field of view according to rules that apply to that digital field of view and the roles of each device in the digital field of view. The view then uses a spatial point representation of the field of view with the ability to use spatial point processes to validate observed changes in the digital environment to determine whether the changes are authentic or not.

By developing the digital field of view methodology using the approaches discussed herein, the processing/computing load can be reduced for devices or sub-systems and/or operate on low-cost hardware even as the digital field of view grows. The digital field of view approaches also allow data verification and management to be scaled in the spatial dimension to account for nearest neighbor integrity. For example, instead of comprehending the universal view, a device or sub-system only has to comprehend its relationship to its nearest neighbors or digital landmarks defined in the digital universal field of view.

In various aspects, system elements, method steps, or examples described throughout this disclosure (such as the systems, or components thereof, for example) may be implemented on one or more computer systems including a central processing unit (CPU), graphics processing unit (GPU), field programmable gate array (FPGA), application specific integrated circuit (ASIC) and/or similar devices comprising hardware executing code to realize those elements, processes, or examples, said code stored on a non-transient data storage device. These devices include or function with software programs, firmware, or other computer readable instructions for carrying out various methods, process tasks, calculations, and control functions.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially designed application-specific integrated circuits (ASICs).

EXAMPLE EMBODIMENTS

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

Example 1 includes a method, comprising: receiving data from a data source; selectively watermarking the data;

mutating the data with a mutation function; converting the data to a watermarked, mutated image; converting the watermarked, mutated image into a two-dimensional randomly distributed, pixelated image; converting the two-dimensional randomly distributed, pixelated image into a three-dimensional mutated image; analyzing the three-dimensional mutated image to determine probabilities for finding points and vacancies in the three-dimensional mutated image.

Example 2 includes the method of example 1, further comprising verifying that the original data has not changed based on the analysis of the three-dimensional mutated image.

Example 3 includes the method of any of examples 1 and 2, wherein converting data comprises converting one or more of software code, software tools, digital images, digital drawings, or digitized text.

Example 4 includes the method of any of examples 1 to 3, wherein mutating the data includes use of a physically unclonable function value or a true random number.

Example 5 includes the method of any of examples 1 to 4, wherein selectively watermarking the data comprises strategically placing watermarks using an algorithm to enhance traceability of features of the data to be tracked for data verification.

Example 6 includes the method of any of examples 1 to 5, wherein converting the watermarked, mutated image into the two-dimensional randomly distributed, pixelated image comprises converting the watermarked, mutated image using a pseudorandom-based algorithm that converts bits of the image to point coordinates and/or vacancies in the X-Z plane such that the bits of data represented by the watermarked, mutated image are represented by points in the 2D randomly distributed, pixelated image.

Example 7 includes the method of example 6, wherein converting the watermarked, mutated image further comprises using a Physically Unclonable Function (PUF) or a true random number generator function of a microelectromechanical system (MEMS) device with the pseudorandom-based algorithm.

Example 8 includes the method of any of examples 1 to 7, wherein converting the two-dimensional randomly distributed, pixelated image into a three-dimensional mutated image comprises randomly moving points of the two-dimensional randomly distributed, pixelated image to heights on the Y-axis, wherein the heights are determined by a random number output of a MEMS sensor.

Example 9 includes the method of any of examples 1 to 8, wherein analyzing the three-dimensional mutated image comprises analyzing the three-dimensional mutated image using a spatial point process.

Example 10 includes the method of any of examples 1 to 9, wherein analyzing the three-dimensional mutated image comprises analyzing the three-dimensional mutated image using a high-frequency reflection function that reflects off of defined boundary walls in a random pattern, wherein the boundaries are defined to include at least some watermarked points.

Example 11 includes the method of any of examples 1 to 19, and further comprising: saving the probabilities for finding different grades of points and vacancies in the three-dimensional mutated image for use in data verification, wherein the different grades of points and vacancies include points, points with watermarks, and vacancies; and sharing the probabilities with devices in a trusted network.

Example 12 includes a method for determining whether data on a device has changed from an original version of the data ("the original data"). The method including: converting the data to a first three-dimensional (3D) spatial representation of the data, wherein the first 3D spatial representation represents multiple characteristics of the data using a position of a point and/or vacancy in the first 3D spatial representation; wherein converting the data to the first 3D spatial representation comprises converting the data using a same process used to generate a second 3D spatial representation from the original data; analyzing the first 3D spatial representation using one or more spatial processes; and determining whether the data has changed based on the analysis of the first 3D spatial representation.

Example 13 includes the method of example 12, wherein analyzing the first 3D spatial representation comprise generating first probabilities, and further comprising: storing probabilities generated by analyzing the original data by: converting the original data to the second 3D spatial representation; analyzing the second 3D spatial representation to determine second probabilities for finding points and vacancies; and storing the second probabilities ("stored probabilities").

Example 14 includes the method of example 13, wherein when analyzing the second 3D spatial representation of the original data is performed by the device, storing information regarding the processes used in the analyzing the second 3D spatial representation of the original data in a memory of the device; and wherein when analyzing the second 3D spatial representation of the original data is performed by another device, receiving and storing information regarding the processes used in the analyzing the second 3D spatial representation of the original data by the other device in a memory of the device.

Example 15 includes the method of any of examples 13 to 14, wherein determining whether the data has changed includes comparing the first probabilities with the stored probabilities.

Example 16 includes the method of example 15, wherein comparing the first probabilities with the second probabilities comprises determining whether a temporal order of point and vacancy detection for the first probabilities matches a temporal order of point and vacancy detection for the stored probabilities.

Example 17 includes the method of any of examples 15 and 16, and further providing a notification that the data has been changed when the first probabilities do not match the stored probabilities.

Example 18 includes the method of example 17, and further not using the data when the first probabilities do not match the stored probabilities.

Example 19 includes the method of any of examples 12 to 18, further receiving first probabilities for the first 3D spatial representation from a mater device; wherein the master device receives a PUF output of a MEMS device for the device as part of an exclusive community and uses the PUF output to generate the second 3D spatial representation of the original data and to generate the first probabilities.

Example 20 includes the method of examples 12 to 19, wherein: converting the data to a first three-dimensional (3D) spatial representation of the data comprises converting the data—that corresponds to a specific version of a software application—to a 3D spatial representation; and determining whether the data has changed comprises determining whether the data corresponds to the anticipated version of the software program.

What is claimed is:

1. A method, comprising:

receiving data from a data source;

selectively watermarking the data;

converting the data to a watermarked, mutated image using a mutation function, wherein the mutation function involves converting the selectively watermarked data to unattributable features;

converting the watermarked, mutated image into a two-dimensional randomly distributed, pixelated image;

converting the two-dimensional randomly distributed, pixelated image into a three-dimensional mutated image;

wherein converting the two-dimensional randomly distributed, pixelated image into a three-dimensional mutated image comprises randomly moving points of the two-dimensional randomly distributed, pixelated image to heights on the Y-axis, and wherein the heights are determined by a random number output from a random number generator function; and analyzing the three-dimensional mutated image to determine probabilities for finding points and vacancies in the three-dimensional mutated image; and determining deviations in received data based on whether the determined probabilities has changed based on the analysis of the 3D mutated image representation beyond a threshold.

2. The method of claim 1, further comprising verifying that the original data has not changed based on the analysis of the three-dimensional mutated image.

3. The method of claim 1, wherein converting data comprises converting one or more of software code, software tools, digital images, digital drawings, or digitized text.

4. The method of claim 1, wherein mutating the data includes use of a physically unclonable function value or a true random number.

5. The method of claim 1, wherein selectively watermarking the data comprises strategically placing watermarks using an algorithm to enhance traceability of features of the data to be tracked for data verification.

6. The method of claim 1, wherein converting the watermarked, mutated image into the two-dimensional randomly distributed, pixelated image comprises converting the watermarked, mutated image using a pseudorandom-based algorithm that converts bits of the image to point coordinates and/or vacancies in the X-Z plane such that the bits of data represented by the watermarked, mutated image are represented by points in the 2D randomly distributed, pixelated image.

7. The method of claim 6, wherein converting the watermarked, mutated image further comprises using a Physically Unclonable Function (PUF) or a true random number generator function of a microelectromechanical system (MEMS) device with the pseudorandom-based algorithm.

8. The method of claim 1, wherein analyzing the three-dimensional mutated image comprises analyzing the three-dimensional mutated image using a spatial point process.

9. The method of claim 1, wherein analyzing the three-dimensional mutated image comprises analyzing the three-dimensional mutated image using a high-frequency reflection function that reflects off of defined boundary walls in a random pattern, wherein the boundaries are defined to include at least some watermarked points.

10. The method of claim 1, and further comprising:

saving the probabilities for finding different grades of points and vacancies in the three-dimensional mutated image for use in data verification, wherein the different grades of points and vacancies include points, points with watermarks, and vacancies; and sharing the probabilities with devices in a trusted network.

11. A method for determining whether data on a device has changed from an original version of the data ("the original data"), the method comprising:

converting the data to a first three-dimensional (3D) spatial representation of the data, wherein the first 3D spatial representation represents multiple characteristics of the data using a position of a point and/or vacancy in the first 3D spatial representation and generate first probabilities;

wherein converting the data to the first 3D spatial representation comprises converting the data using a same process used to generate a second 3D spatial representation from the original data and generate second probabilities;

analyzing the first 3D spatial representation using one or more spatial processes; and determining whether the data has changed based on the analysis of the first 3D spatial representation; and wherein comparing the first probabilities with the second probabilities comprises determining whether a temporal order of point and vacancy detection for the first probabilities matches a temporal order of point and vacancy detection for the stored probabilities.

12. The method of claim 11, wherein analyzing the first 3D spatial representation comprise generating first probabilities, and further comprising:

storing probabilities generated by analyzing the original data by:

converting the original data to the second 3D spatial representation;

analyzing the second 3D spatial representation to determine second probabilities for finding points and vacancies; and storing the second probabilities ("stored probabilities").

13. The method of claim 12, wherein when analyzing the second 3D spatial representation of the original data is performed by the device, storing information regarding the processes used in the analyzing the second 3D spatial representation of the original data in a memory of the device; and wherein when analyzing the second 3D spatial representation of the original data is performed by another device, receiving and storing information regarding the processes used in the analyzing the second 3D spatial representation of the original data by the other device in a memory of the device.

14. The method of claim 12, wherein determining whether the data has changed includes comparing the first probabilities with the stored probabilities.

15. The method of claim 14, and further providing a notification that the data has been changed when the first probabilities do not match the stored probabilities.

16. The method of claim 15, and further not using the data when the first probabilities do not match the stored probabilities.

17. The method of claim 11, further receiving first probabilities for the first 3D spatial representation from a mater device;

wherein the master device receives a PUF output of a MEMS device for the device as part of an exclusive community and uses the PUF output to generate the second 3D spatial representation of the original data and to generate the first probabilities.

18. The method of claim 11, wherein:

converting the data to a first three-dimensional (3D) spatial representation of the data comprises converting the data—that corresponds to a specific version of a software application—to a 3D spatial representation; and determining whether the data has changed comprises determining whether the data corresponds to the anticipated version of the software program.

* * * * *